US010802880B2

(12) United States Patent
Bergsma et al.

(10) Patent No.: US 10,802,880 B2
(45) Date of Patent: Oct. 13, 2020

(54) SYSTEM AND METHOD FOR DISTRIBUTED RESOURCE REQUIREMENT AND ALLOCATION

(71) Applicant: Huawei Technologies Co., Ltd., Shenzhen (CN)

(72) Inventors: Shane Anthony Bergsma, Markham (CA); Reza Pournaghi, North York (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 15/927,677

(22) Filed: Mar. 21, 2018

(65) Prior Publication Data
US 2019/0087232 A1 Mar. 21, 2019

Related U.S. Application Data

(60) Provisional application No. 62/560,443, filed on Sep. 19, 2017.

(51) Int. Cl.
*G06F 9/46* (2006.01)
*G06F 9/50* (2006.01)
(52) U.S. Cl.
CPC ...... *G06F 9/5038* (2013.01); *G06F 2209/505* (2013.01); *G06F 2209/5011* (2013.01); *G06F 2209/5014* (2013.01)
(58) Field of Classification Search
CPC .......................................................... G06F 9/52
USPC ......................................................... 718/104
See application file for complete search history.

(56) References Cited

U.S. PATENT DOCUMENTS

| 7,620,706 | B2 | 11/2009 | Jackson |
| 8,555,281 | B1* | 10/2013 | van Dijk ............... G06F 9/4881 718/100 |
| 2002/0072956 | A1* | 6/2002 | Willems ................ G06Q 10/04 705/7.31 |
| 2012/0110584 | A1* | 5/2012 | Chaudhry ............. G06F 9/5027 718/102 |

(Continued)

FOREIGN PATENT DOCUMENTS

| CN | 102929718 A | 2/2013 |
| CN | 104035817 A | 9/2014 |

(Continued)

OTHER PUBLICATIONS

A. Verma, L. Cherkasova, R.H. Campbell, ARIA: Automatic Resource Inference and Allocation for MapReduce Environments, In Proc. ICAC 2011.

(Continued)

*Primary Examiner* — Mehran Kamran
(74) *Attorney, Agent, or Firm* — Slater Matsil, LLP

(57) ABSTRACT

Duration information indicative of an amount of time taken by each of one or more tasks of a distributed compute phase of a distributed compute job in a distributed compute cluster to execute is obtained. The one or more tasks are sorted into one or more groups based on the duration information and a resource requirement is determined for each of the one or more groups. A time-varying allocation of resources of the distributed compute cluster for the phase is determined based on the resource requirement for each of the one or more groups.

33 Claims, 16 Drawing Sheets

(56) References Cited

U.S. PATENT DOCUMENTS

| | | | |
|---|---|---|---|
| 2012/0198466 A1* | 8/2012 | Cherkasova | G06F 9/5066 718/104 |
| 2012/0198467 A1 | 8/2012 | Jackson | |
| 2012/0311589 A1* | 12/2012 | Agarwal | G06F 9/5066 718/102 |
| 2012/0317578 A1 | 12/2012 | Kansal et al. | |
| 2014/0282421 A1* | 9/2014 | Jubran | G06F 11/3664 717/126 |
| 2014/0380320 A1* | 12/2014 | Lin | G06F 9/4881 718/102 |
| 2015/0113540 A1* | 4/2015 | Rabinovici | G06F 9/5011 718/104 |
| 2015/0169291 A1* | 6/2015 | Dube | G06F 8/20 717/101 |
| 2015/0199208 A1* | 7/2015 | Huang | G06F 9/45533 718/1 |
| 2015/0261462 A1* | 9/2015 | Miwa | G06F 3/0629 711/114 |
| 2015/0355951 A1* | 12/2015 | Cherkasova | G06F 9/5083 718/104 |
| 2016/0320825 A1* | 11/2016 | Panda | G06F 1/3206 |
| 2016/0323377 A1* | 11/2016 | Einkauf | H04L 67/1076 |
| 2016/0350376 A1* | 12/2016 | Marecek | G06F 16/24532 |
| 2016/0350377 A1* | 12/2016 | Marecek | G06F 16/24532 |
| 2017/0255496 A1* | 9/2017 | Deng | G06F 9/4881 |
| 2017/0372229 A1* | 12/2017 | Ura | G06N 20/00 |
| 2018/0032376 A1* | 2/2018 | Udava | G06F 9/5061 |
| 2018/0143858 A1 | 5/2018 | Sanjabi et al. | |
| 2018/0198855 A1* | 7/2018 | Wang | G06F 9/4881 |
| 2018/0260253 A1* | 9/2018 | Nanda | G06Q 10/083 |
| 2018/0329750 A1* | 11/2018 | Lin | G06F 9/50 |
| 2019/0034223 A1* | 1/2019 | Yang | G06F 9/4881 |

FOREIGN PATENT DOCUMENTS

| | | |
|---|---|---|
| CN | 106155791 A | 11/2016 |
| WO | 2016178951 A1 | 11/2016 |
| WO | 2016193851 A1 | 12/2016 |

OTHER PUBLICATIONS

N. Shrivastava, C. Buragohain, D. Agrawal, S. Suri, Medians and Beyond: New Aggregation Techniques for Sensor Networks, In Proc. SenSys 2004.

Gianniti, E. et al., "A Game-Theoretic Approach for Runtime Capacity Allocation in MapReduce", 2017 17th IEEE/ACM International Symposium on Cluster, Cloud and Grid Computing, 10 pages.

* cited by examiner

SYSTEM AND METHOD FOR DISTRIBUTED RESOURCE REQUIREMENT AND ALLOCATION

CROSS-REFERENCE TO RELATED APPLICATIONS

The present application claims priority under 35 U.S.C. 119(e) of Provisional Patent Application bearing Ser. No. 62/560,443 filed on Sep. 19, 2017, the contents of which are hereby incorporated by reference.

FIELD

Embodiments described herein generally relate to the field of distributed computing, more particularly to resource requirement and allocation.

BACKGROUND

Compute workflows consist of multiple interdependent compute tasks that run in a distributed computing cluster. For distributed compute jobs that run repeatedly over time, it is desirable to specify the resource requirements of all phases of a job and an allocation for each of the phases. In this manner, the necessary resources can be reserved so the phase can complete and the position of the phase and the job within a larger workflow plan can be determined. Still, due to the complexity of workflows, specifying the resource requirements concisely and accurately proves challenging. In addition, since phases run with a varying number of resources over time, it becomes difficult to use information from historical runs of a phase to decide on a single resource requirement. Another issue is to find, given a specific resource requirement definition, a resource allocation shape that guarantees that tasks will finish within their allocation.

There is therefore a need for an improved system and method for resource requirement and allocation in a distributed computing system.

SUMMARY

In accordance with one aspect, there is provided a method comprising obtaining duration information indicative of an amount of time taken by one or more tasks of a distributed compute phase to execute, sorting the one or more tasks into one or more groups based on the duration information and defining a resource requirement for each of the one or more groups, and determining from the resource requirement a time-varying allocation of resources for the phase.

In some example embodiments, obtaining the duration information may comprise obtaining input data from one or more historical runs of the phase and extracting the duration information from the input data.

In some example embodiments, the input data may be stationary over time and an amount of the input data may be below a predetermined threshold and the duration information may be extracted for all of the one or more tasks.

In some example embodiments, the input data may be stationary over time and an amount of the input data may be above a predetermined threshold and the duration information may be extracted for a random selection of durations associated with the one or more tasks.

In some example embodiments, the input data may be stationary over time and an amount of the input data may be above a predetermined threshold and the duration information may be extracted for a predetermined number of durations associated with the one or more tasks.

In some example embodiments, the input data may be stationary over time and an amount of the received input data may be above a predetermined threshold and extracting the duration information may comprise applying a streaming data technique to obtain tiered duration information.

In some example embodiments, the input data may exhibit at least one time-varying pattern and extracting the duration information may comprise obtaining from the input data historical percentile duration information for each of the one or more historical runs of the phase, and forecasting, based on the historical percentile duration information, predicted percentile duration information for at least one future run of each phase.

In some example embodiments, the one or more tasks may be performed in one or more compute slots and sorting the one or more tasks into one or more groups may comprise determining a partition of the one or more groups that meets a desired number for the one or more groups and minimizes a total area of the one or more compute slots.

In some example embodiments, determining the partition of the one or more groups may comprise applying a dynamic programming technique to minimize a cost function representative of the total area.

In some example embodiments, sorting the one or more tasks into one or more groups may comprise (a) computing a first total area of the one or more compute slots with the one or more tasks sorted into a first number of the one or more groups, (b) incrementing the first number by a predetermined step, thereby obtaining a second number for the one or more groups, (c) computing a second total area of the one or more compute slots with the one or more tasks sorted into the second number of the one or more groups, (d) computing a difference between the first total area and the second total area and comparing the difference to a predetermined threshold, (e) responsive to determining that the difference is within the threshold, setting the first number as the desired number, and (f) responsive to determining that the difference is beyond the threshold, incrementing the second number by the predetermined step, thereby obtaining a third number for the one or more groups, setting the second number as the first number, setting the third number as the second number, and repeating steps (a) to (f).

In some example embodiments, defining the resource requirement may comprise specifying, for each of the one or more groups, a number of the one or more tasks, an average task duration, and a maximum task duration.

In some example embodiments, determining the allocation of resources for the phase may comprise, for each of the one or more groups determining an upper bound on a time until completion of a given one of the one or more tasks that is last to finish, and creating an allocation shape based on the upper bound, the allocation shape having a width equal to a value of the upper bound.

In accordance with another aspect, there is provided a computer-implemented method for allocating resources of a distributed compute cluster for execution of a distributed compute job in the distributed compute cluster. The method comprises obtaining duration information indicative of an amount of time taken by each of one or more tasks of a distributed compute phase of the distributed compute job to execute, sorting the one or more tasks into one or more groups based on the duration information and determining a resource requirement for each of the one or more groups, and determining, based on the resource requirement for each of the one or more groups, a time-varying allocation of the resources of the distributed compute cluster for the phase.

In some example embodiments, the input data is stationary over time and an amount of the input data is below a predetermined threshold and the duration information is extracted for all of the one or more tasks.

In some example embodiments, the input data is stationary over time and an amount of the input data is above a predetermined threshold and the duration information is extracted for a random selection of durations associated with the one or more tasks.

In some example embodiments, the input data is stationary over time and an amount of the input data is above a predetermined threshold and the duration information is extracted for a predetermined number of durations associated with the one or more tasks.

In some example embodiments, the tasks are to be performed in one or more compute slots and sorting the one or more tasks into one or more groups comprises determining a partition of the one or more groups that meets a desired number for the one or more groups and minimizes a total area of the one or more compute slots.

In some example embodiments, sorting the one or more tasks into one or more groups comprises:

(a) computing a first total area of the one or more compute slots with the one or more tasks sorted into a first number of the one or more groups;

(b) incrementing the first number by a predetermined step, thereby obtaining a second number for the one or more groups;

(c) computing a second total area of the one or more compute slots with the one or more tasks sorted into the second number of the one or more groups;

(d) computing a difference between the first total area and the second total area and comparing the difference to a predetermined threshold;

(e) responsive to determining that the difference is within the threshold, setting the first number as the desired number; and (f) responsive to determining that the difference is beyond the threshold, incrementing the second number by the predetermined step, thereby obtaining a third number for the one or more groups, setting the second number as the first number, setting the third number as the second number, and repeating steps (a) to (f).

In some example embodiments, determining the resource requirement comprises determining, for each of the one or more groups, a number of the one or more tasks, an average task duration, and a maximum task duration.

In some example embodiments, determining the allocation of resources for the phase comprises, for each of the one or more groups:

determining an upper bound on a time until completion of a given one of the one or more tasks that is last to finish; and creating, based on the upper bound, a two-dimensional shape representative of the allocation of resources for the phase, the shape having a width equal to a value of the upper bound.

In some example embodiments, the method may further comprise receiving the distributed compute job from a job submitter.

In some example embodiments, the method may further comprise outputting the time-varying allocation of the resources to a resource planner for planning execution of the distributed compute job in the distributed compute cluster.

In accordance with another aspect, there is provided a node comprising at least one processing unit and a non-transitory memory communicatively coupled to the at least one processing unit and comprising computer-readable program instructions executable by the at least one processing unit for obtaining duration information indicative of an amount of time taken by one or more tasks of a distributed compute phase to execute, sorting the one or more tasks into one or more groups based on the duration information and defining a resource requirement for each of the one or more groups, and determining from the resource requirement a time-varying allocation of resources for the phase.

In some example embodiments, the computer-readable program instructions may be executable by the at least one processing unit for obtaining input data from one or more historical runs of the phase and extracting the duration information from the input data.

In some example embodiments, the input data may be stationary over time and an amount of the input data may be below a predetermined threshold and the computer-readable program instructions may be executable by the at least one processing unit for extracting the duration information for all of the one or more tasks.

In some example embodiments, the input data may be stationary over time and an amount of the input data may be above a predetermined threshold and the computer-readable program instructions may be executable by the at least one processing unit for extracting the duration information for a random selection of durations associated with the one or more tasks.

In some example embodiments, the input data may be stationary over time and an amount of the input data may be above a predetermined threshold and the computer-readable program instructions may be executable by the at least one processing unit for extracting the duration information for a predetermined number of durations associated with the one or more tasks.

In some example embodiments, the input data may be stationary over time and an amount of the received input data may be above a predetermined threshold and the computer-readable program instructions may be executable by the at least one processing unit for applying a streaming data technique to obtain tiered duration information.

In some example embodiments, the input data may exhibit at least one time-varying pattern and the computer-readable program instructions may be executable by the at least one processing unit for extracting the duration information comprising obtaining from the input data historical percentile duration information for each of the one or more historical runs of the phase, and forecasting, based on the historical percentile duration information, predicted percentile duration information for at least one future run of each phase.

In some example embodiments, the one or more tasks may be performed in one or more compute slots and the computer-readable program instructions may be executable by the at least one processing unit for sorting the one or more tasks into one or more groups comprising determining a partition of the one or more groups that meets a desired number for the one or more groups and minimizes a total area of the one or more compute slots.

In some example embodiments, the computer-readable program instructions may be executable by the at least one processing unit for applying a dynamic programming technique to minimize a cost function representative of the total area.

In some example embodiments, the computer-readable program instructions may be executable by the at least one processing unit for sorting the one or more tasks into one or more groups comprising (a) computing a first total area of the one or more compute slots with the one or more tasks sorted into a first number of the one or more groups, (b) incrementing the first number by a predetermined step, thereby obtaining a second number for the one or more groups, (c) computing a second total area of the one or more compute slots with the one or more tasks sorted into the second number of the one or more groups, (d) computing a difference between the first total area and the second total area and comparing the difference to a predetermined threshold, (e) responsive to determining that the difference is within the threshold, setting the first number as the desired number, and (f) responsive to determining that the difference is beyond the threshold, incrementing the second number by the predetermined step, thereby obtaining a third number for the one or more groups, setting the second number as the first number, setting the third number as the second number, and repeating steps (a) to (f).

In some example embodiments, the computer-readable program instructions may be executable by the at least one processing unit for defining the resource requirement comprising specifying, for each of the one or more groups, a number of the one or more tasks, an average task duration, and a maximum task duration.

In some example embodiments, the computer-readable program instructions may be executable by the at least one processing unit for determining the allocation of resources for the phase comprising, for each of the one or more groups determining an upper bound on a time until completion of a given one of the one or more tasks that is last to finish, and creating an allocation shape based on the upper bound, the allocation shape having a width equal to a value of the upper bound.

In accordance with another aspect, there is provided a computer readable medium having stored thereon program code executable by a processor for obtaining duration information indicative of an amount of time taken by one or more tasks of a distributed compute phase to execute, sorting the one or more tasks into one or more groups based on the duration information and defining a resource requirement for each of the one or more groups, and determining from the resource requirement a time-varying allocation of resources for the phase.

In accordance with another aspect, there is provided a computing device for allocating resources of a distributed compute cluster for execution of a distributed compute job in the distributed compute cluster. The computing device comprises at least one processing unit and a non-transitory memory communicatively coupled to the at least one processing unit and storing computer-readable program instructions executable by the at least one processing unit for obtaining duration information indicative of an amount of time taken by each of one or more tasks of a distributed compute phase of the distributed compute job to execute, sorting the one or more tasks into one or more groups based on the duration information and determining a resource requirement for each of the one or more groups, and determining, based on the resource requirement for each of the one or more groups, a time-varying allocation of the resources of the distributed compute cluster for the phase.

In some example embodiments, the input data is stationary over time and an amount of the input data is below a predetermined threshold and the computer-readable program instructions are executable by the at least one processing unit for extracting the duration information for all of the one or more tasks.

In some example embodiments, the input data is stationary over time and an amount of the input data is above a predetermined threshold and the computer-readable program instructions are executable by the at least one processing unit for extracting the duration information for a random selection of durations associated with the one or more tasks.

In some example embodiments, the input data is stationary over time and an amount of the input data is above a predetermined threshold and further wherein the computer-readable program instructions are executable by the at least one processing unit for extracting the duration information for a predetermined number of durations associated with the one or more tasks.

In some example embodiments, the computer-readable program instructions are executable by the at least one processing unit for sorting the one or more tasks into one or more groups comprising:

(a) computing a first total area of the one or more compute slots with the one or more tasks sorted into a first number of the one or more groups;

(b) incrementing the first number by a predetermined step, thereby obtaining a second number for the one or more groups;

(c) computing a second total area of the one or more compute slots with the one or more tasks sorted into the second number of the one or more groups;

(d) computing a difference between the first total area and the second total area and comparing the difference to a predetermined threshold;

(e) responsive to determining that the difference is within the threshold, setting the first number as the desired number; and (f) responsive to determining that the difference is beyond the threshold, incrementing the second number by the predetermined step, thereby obtaining a third number for the one or more groups, setting the second number as the first number, setting the third number as the second number, and repeating steps (a) to (f).

In some example embodiments, the computer-readable program instructions are executable by the at least one processing unit for determining the allocation of resources for the phase comprising, for each of the one or more groups:

determining an upper bound on a time until completion of a given one of the tasks that is last to finish; and creating, based on the upper bound, a two-dimensional shape representative of the allocation of resources for the phase, the shape having a width equal to a value of the upper bound.

In some example embodiments, the computer-readable program instructions are executable by the at least one processing unit for receiving the distributed compute job from a job submitter.

In some example embodiments, the computer-readable program instructions are executable by the at least one processing unit for outputting the time-varying allocation of the resources to a resource planner for planning execution of the distributed compute job in the distributed compute cluster.

In accordance with another aspect, there is provided a non-transitory computer readable medium having stored thereon program code or allocating resources of a distributed compute cluster for execution of a distributed compute job in the distributed compute cluster, the program code executable by a processor for obtaining duration information indicative of an amount of time taken by each task of a distributed compute phase of the distributed compute job to execute, sorting the tasks into one or more groups based on the duration information and determining a resource requirement for each of the one or more groups, and determining, based on the resource requirement, a time-varying allocation of the resources of the distributed compute cluster for the phase.

Many further features and combinations thereof concerning the present improvements will appear to those skilled in the art following a reading of the instant disclosure.

DESCRIPTION OF THE FIGURES

In the figures.

It will be noted that throughout the appended drawings, like features are identified by like reference numerals.

DETAILED DESCRIPTION

Figure 1A:
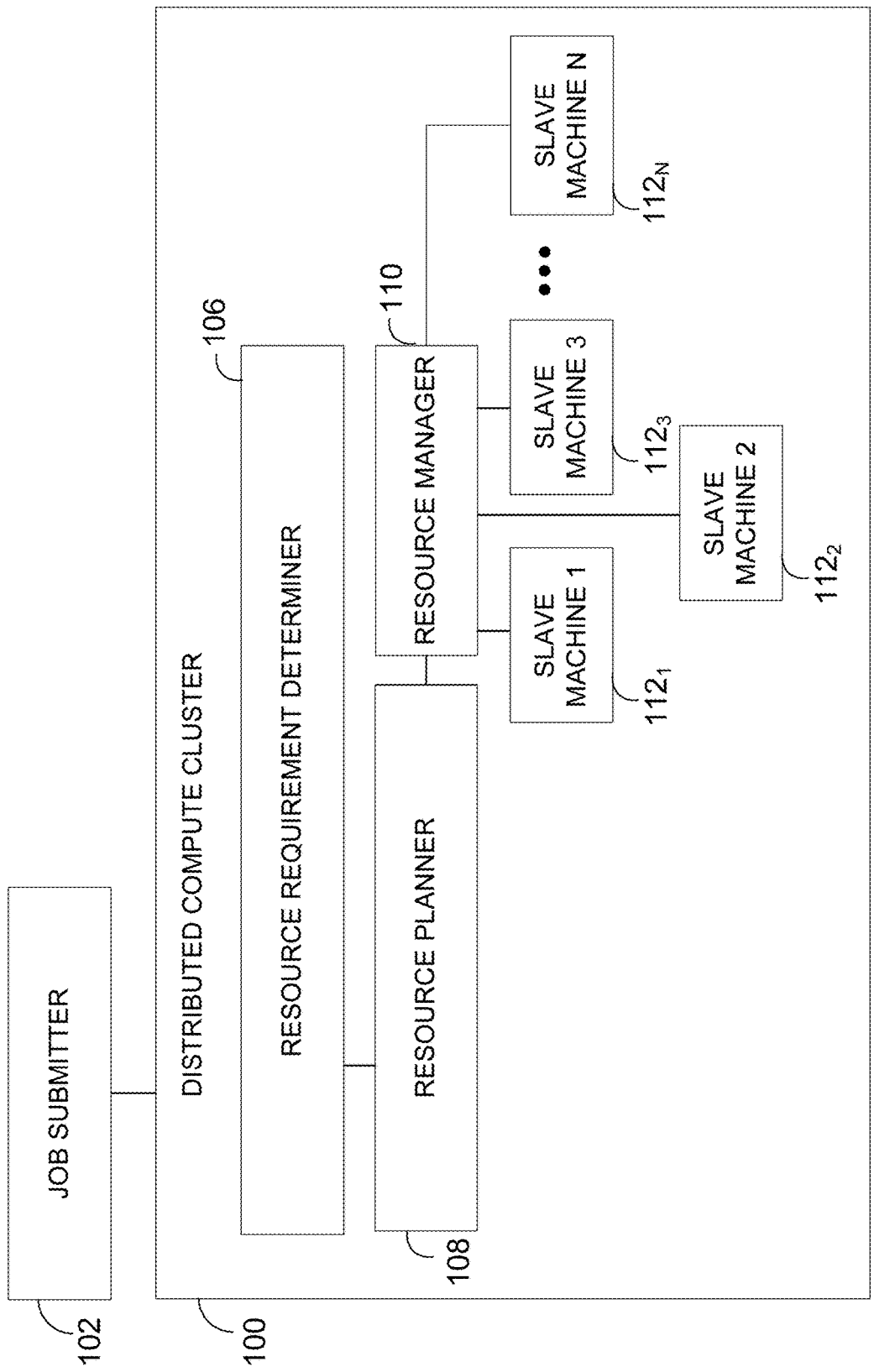
FIG. 1A is a schematic diagram of a distributed compute cluster, in accordance with one embodiment.

Referring to FIG. 1A, an example of a compute cluster 100 of a distributed computing system, in accordance with one embodiment, will now be described. For sake of simplicity, the compute cluster 100 is illustrated as communicating with a job submitter 102 that is configured to submit (e.g. send), to the compute cluster 100, distribute compute jobs (referred to herein as jobs), which can be run repeatedly over time on the compute cluster 104. As used herein, the term "compute cluster" refers to a combination of software modules and hardware devices that are configured to run or execute jobs. In the embodiment depicted in FIG. 1A, the compute cluster 100 comprises a resource requirement determiner 106, a resource planner 108, a resource manager 110, and a group of (N) computing devices $112_1$, $112_2$, $112_3$, ... $112_N$ (commonly referred to in the art as nodes). Each computing device is a slave device. Examples of the job submitter 102 include, but are not limited to, Hive, Pig, Oracle, TeraData, File Transfer Protocol (FTP), Secure Shell (SSH), HBase, and Hadoop Distributed File System (HDFS).

The job submitter 102 depicted in FIG. 1A may be implemented on an external computing device that is in communication with the compute cluster 100 of the distributed computing system to submit distribute compute jobs to the resource requirement determiner 106. Alternatively, the job submitter 102 may be a software module comprising computer-readable instructions, which when running or executing on the compute cluster 100, causes the job submitter 102 to submit (e.g. send) distribute compute jobs to the resource requirement determiner 106 of the compute cluster 100.

The resource requirement determiner 106 may be a computing device executing software to receive one or more jobs from the job submitter 102 and determine resource requirements for each job. Each job includes one or more phases (also referred to as "stages"), where each phase comprises one or more tasks, which run as processes on a given resource of a distributed computing platform. As used herein, the term "resource requirement" refers to the aggregate resources required to execute the tasks of each phase of the job, over time. As used herein, the term "resource" refers, but is not limited, to Central Processing Unit (CPU) usage, memory (e.g. Random Access Memory (RAM)) usage, and network bandwidth usage. The resource planner 108 is configured to determine a resource allocation, i.e. a share of resources to be allocated to a job (or phase of a job), over time. In other words, as used herein, the term "resource allocation" refers to a time varying amount of resources provided for execution of the one or more tasks of the phase by the computing devices of the compute cluster. In some embodiments, the resource allocation determined by the resource planner 108 is set to begin at a specific point in time (e.g. 10 slave machines, $112_1$, $112_2$, $112_3$, ... $112_N$ for 10 minutes, starting at 1:00 PM), in advance of the job actually getting submitted. Such a resource allocation is referred to as "resource reservation" and is provided to the resource manager 110 so the latter can assign tasks accordingly, as will be discussed further below. The resource allocation determined by the resource planner 108 may also be defined as a resource allocation over time (referred to herein as an "allocation shape"), i.e. a number of compute slots to be provided in parallel over time for future runs of a given job. As used herein, the term "compute slot" refers to a resource (e.g. memory) provided on a computing device $112_1$, $112_2$, $112_3$, ... or $112_N$ of the compute cluster 100, each task running in one or more slots. As will be discussed further below, in one embodiment, the allocation shape is represented in a two-dimensional coordinate system as a form having a given width and height.

The resource manager 110 is configured to distribute (e.g. send) jobs on available resources (i.e. assigns resources to tasks), based on each job's resource requirements provided by the resource requirement determiner 106 and on the currently available resources. The resource manager 110 is also configured to enforce the resource allocation determined by the resource planner 108, thereby making tasks run faster or slower. The resource manager 110 may comprise, but is not limited to, a scheduler (e.g. Yet Another Resource Negotiator (YARN), Mesos, Platform Load Sharing Facility (LSF), GridEngine, Kubernetes, or the like), and a data warehouse system enabled with features to enforce quality of service (QoS) (e.g. Relational Database Management System (RDBMS) or the like).

Figure 1B:
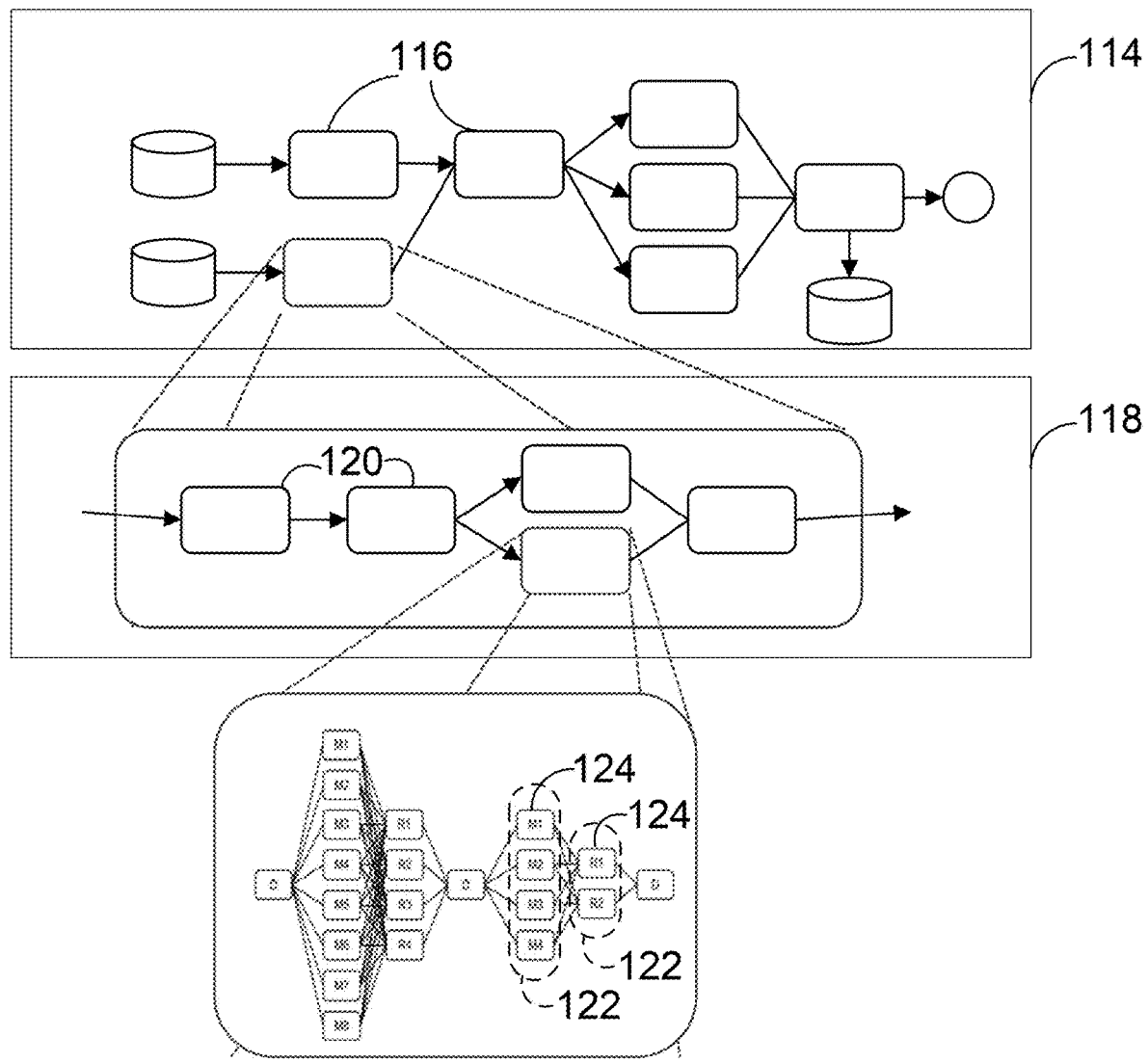
FIG. 1B is a schematic diagram of a compute workflow, in accordance with one embodiment.

Referring now to FIG. 1B in addition to FIG. 1A, business logic is encapsulated into a business tier workflow 114 (e.g. a workflow graph). As used herein, the term business tier workflow refers to a set of interdependent business tier actions 116 defined by a business user. A Hive query is an example of a business tier action 116. Each business tier action 116 is a single action in the business tier workflow 114, may depend on the completion of one or more other business tier actions 116. The business tier actions 116 are converted into one or more jobs 120, and each job 120 is executed on the distributed compute cluster 104. In some embodiments, a single business tier action 116 may be converted into a set of interdependent jobs 120. An example of a job 120 of a business tier action 116 may be a Map/Reduce job submitted by Hive to YARN.

In one embodiment, the business logic is specified using a workflow orchestrator (not shown), which is a module that includes special purpose computer program instructions for identifying workflow(s) used to carry out a business transaction and organizing the workflow(s) on the computing devices $112_1$, $112_2$, $112_3$, . . . $112_N$. A user of the workflow orchestrator is referred to herein as a "business user".

Still referring to FIG. 1B, a compute workflow generally comprises a sequence of parallelizable jobs 120. Each job 120 includes one or more phases (also referred to as "stages") 122, where each phase 122 comprises one or more tasks 124, which run as processes on a given resource of a distributed computing platform. Again, as used herein, the term "resource" refers, but is not limited, to Central Processing Unit (CPU) usage, Random Access Memory (RAM) usage, and network bandwidth usage. The tasks 124 of a given phase 122 execute the same compute function and all tasks 124 of a given phase 122 typically require the same amount of resources. As used herein, the term "phase" therefore refers to a set of tasks 124 having homogeneous resource needs and executing a common compute function. It should be understood that some tasks 124 of a given phase 122 may finish later than other tasks 124 of the phase because some tasks 124 may operate on different sources of input data or run on heterogeneous hardware. As will be described further below, it is proposed herein to capture (through a resource requirement specification) and make use of (through a resource allocation) any subset of tasks 124 within a given phase 122 that predictably finish at different time intervals. In one embodiment, each job 120 comprises a single phase 122. In another embodiment, each job 120 comprises a sequence of phases 122, as illustrated in FIG. 1B. In yet another embodiment, the phases 122 run in parallel within the job 120. As one example, in the MapReduce framework, there may be one Map phase followed in sequence by one Reduce phase. Each phase 122 executes a series of basic computing tasks 124, which represent basic units of work that are typically implemented serially on a computing host. For example, a task 124 may be a single Map task or Reduce task working on one block of data. Tasks 124 can be seen as individual compute containers that run on the slave machines $112_1$, $112_2$, $112_3$, . . . $112_N$ of the distributed compute cluster 104 (e.g. as processes on a given resource of the distributed computing system) for a period of time, such that the collective output of a group of tasks 124 operating in parallel accomplishes the goals of a given phase 122. Similarly, the collective output of a group of phases 122 accomplishes the goals of the given job 120.

The nature and structure of the tasks 124 depend on the software application or software program used by the corresponding business tier action 116 to perform its work, i.e. a given action in the business tier workflow 114. As previously mentioned, the tasks 124 of a given phase 122 execute the same compute function and all tasks 124 in a given phase 122 are assumed to require the same amount of resources, with each task 124 requiring some share of the resources, for some period of time, in order to complete its computation. Within a phase, tasks 124 may run on the compute cluster 104 one after the other, all in parallel, some portion in parallel at any given time, or the like, such that compute phases as in 122 are referred to as "elastic". There may also be dependencies between the phases 122, such that all the tasks 124 of one phase may have to finish before one or more subsequent phases 122 start (e.g. the output of one phase 122 is the input to the next).

Figure 2:
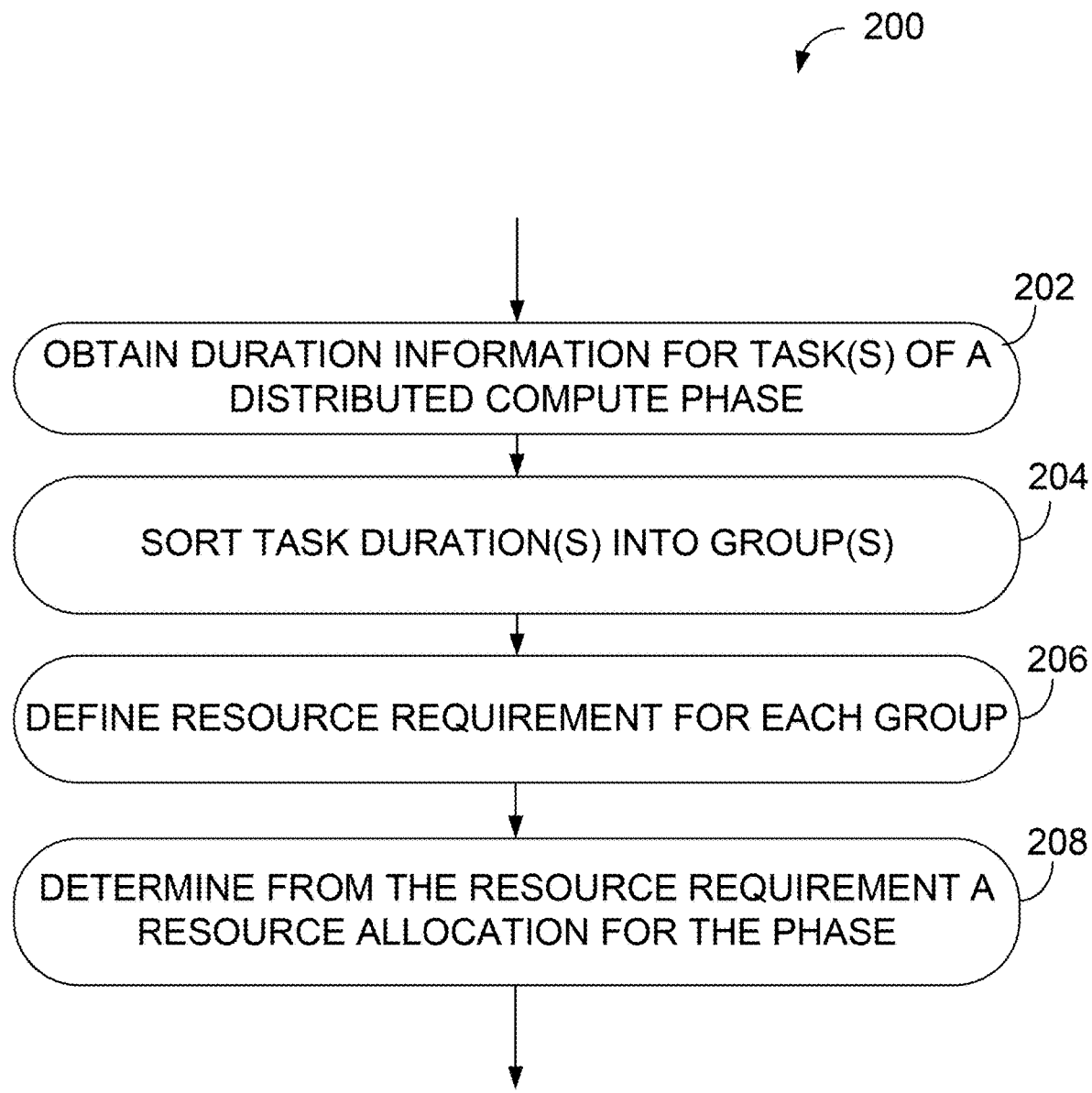
FIG. 2 illustrates a flowchart of an example method for resource requirement and resource allocation definition in a distributed computing system, in accordance with one embodiment.

Referring now to FIG. 2, an example method 200 for resource requirement and resource allocation in a distributed compute cluster of a distributed computing system will now be described. The method 200 comprises obtaining at step 202 duration information for one or more tasks of each phase (referred to in FIG. 2 as a "distributed compute phase") of a distributed compute job. As used herein, the term "duration" refers to the amount of time to execute a given task, with each task having a single duration. The term "duration information" refers to a set of one or more task durations. The one or more task durations are then sorted into one or more fine-grained groups (step 204), which can in turn be provided as input (e.g. to a scheduler and/or a resource manager) for scheduling and planning of the phases (and, accordingly, of the jobs) over time on a computer cluster. In particular, a resource requirement, namely the number and the duration of the tasks in each group, is provided for the purpose of specifying the total resources that the phase will need for future run(s) (step 206). The resource requirement may be regarded as a specification of the expected statistical distribution (also referred to as a "shape") of durations for a future compute phase. A time-varying resource allocation for the phase is also determined from the resource requirement (step 208). The purpose of the resource allocation is to provide an indication of the number of resources to be allocated to the phase over time such that all tasks will finish within the allocation regardless of the order in which the tasks are executed.

In one embodiment, the method 200 described herein is performed for each phase of the job and results in aggregate resource requirements being obtained over all phases of the job. In particular, the resource allocation is a dedication of aggregate resources to a given phase of a compute job, over time, without specifying the share of the resources consumed by any given task or the order in which the tasks will run. As will be understood by those skilled in the art, the dedicated resources may be provided through a dedicated resource queue or pool. In another embodiment (where the tasks of all phases have homogeneous resource requirements), the method 200 is performed collectively for all tasks over all phases of the job, especially if the phases run in parallel. In yet another embodiment, the method 200 is performed collectively for all tasks over multiple jobs.

Given the resource allocation determined at step 208, the tasks can be scheduled and assigned to respective compute slots for execution, using a scheduler and/or a resource manager for example. As used herein, the term "compute slot" refers to a share of a resource used to perform a given task. In one embodiment, the resource allocation (e.g. the number of allocated resources) determined at step 208 is less than or equal to the total number of tasks. It should be understood that, when the resource allocation is less than the total number of tasks, some tasks may wait for resources to become available and run only after other tasks have finished.

Figure 3:
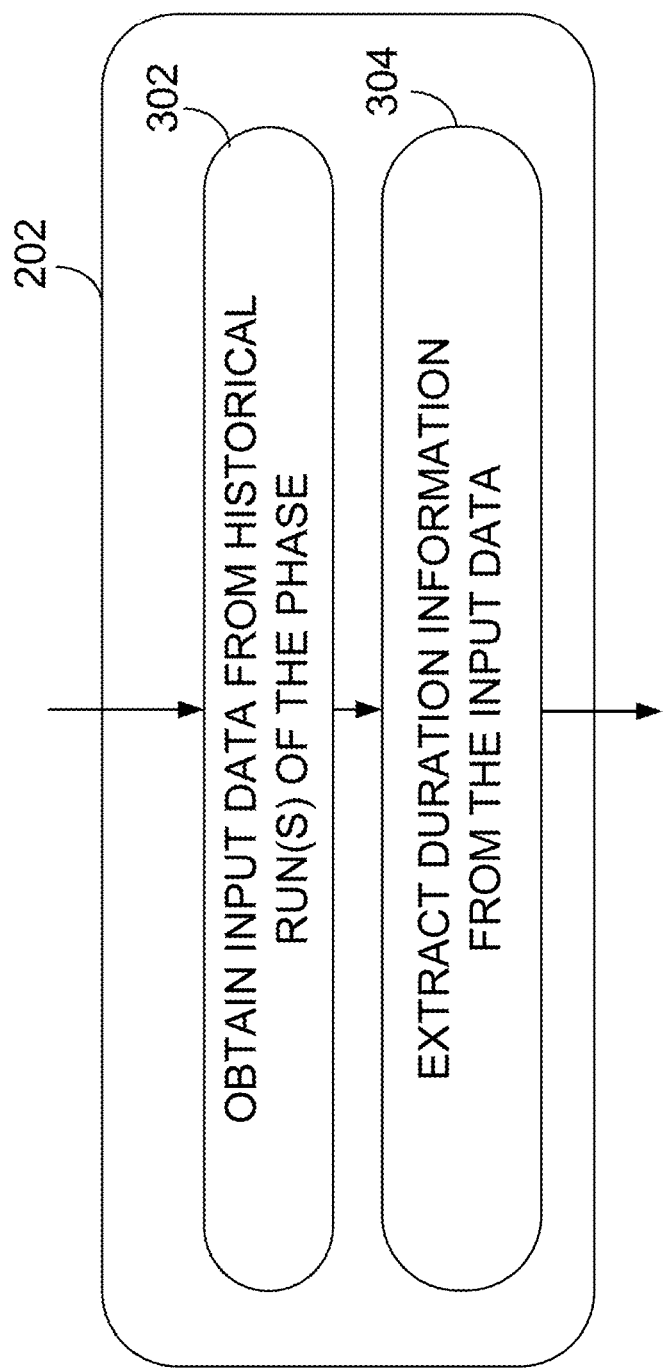
FIG. 3 illustrates a flowchart of the step of FIG. 2 of obtaining duration information for task(s) of a distributed compute phase.

Referring now to FIG. 3, the step 202 of obtaining duration information comprises obtaining at step 302 input data from one or more historical runs of the phase and extracting at step 304 the duration information from the input data. A given phase may for example run each day (on data specific to that day) for a predetermined number of days and data associated with multiple runs of the phase may accordingly be saved in memory for subsequent retrieval and use as input data at step 202. It should be understood that the resource needs (e.g. memory and CPU requirements) for each task of the phase may also be stored in memory for subsequent use in specifying the aggregate resource requirement. In one embodiment, the input data is provided as one or more tables, each indicative of the resource utilization over time of tasks executed for a given day on which the phase runs. Each task is typically represented in a given table with a value for its duration. It should however be understood that the input data may be provided in any suitable format other than tables.

Figure 4A:
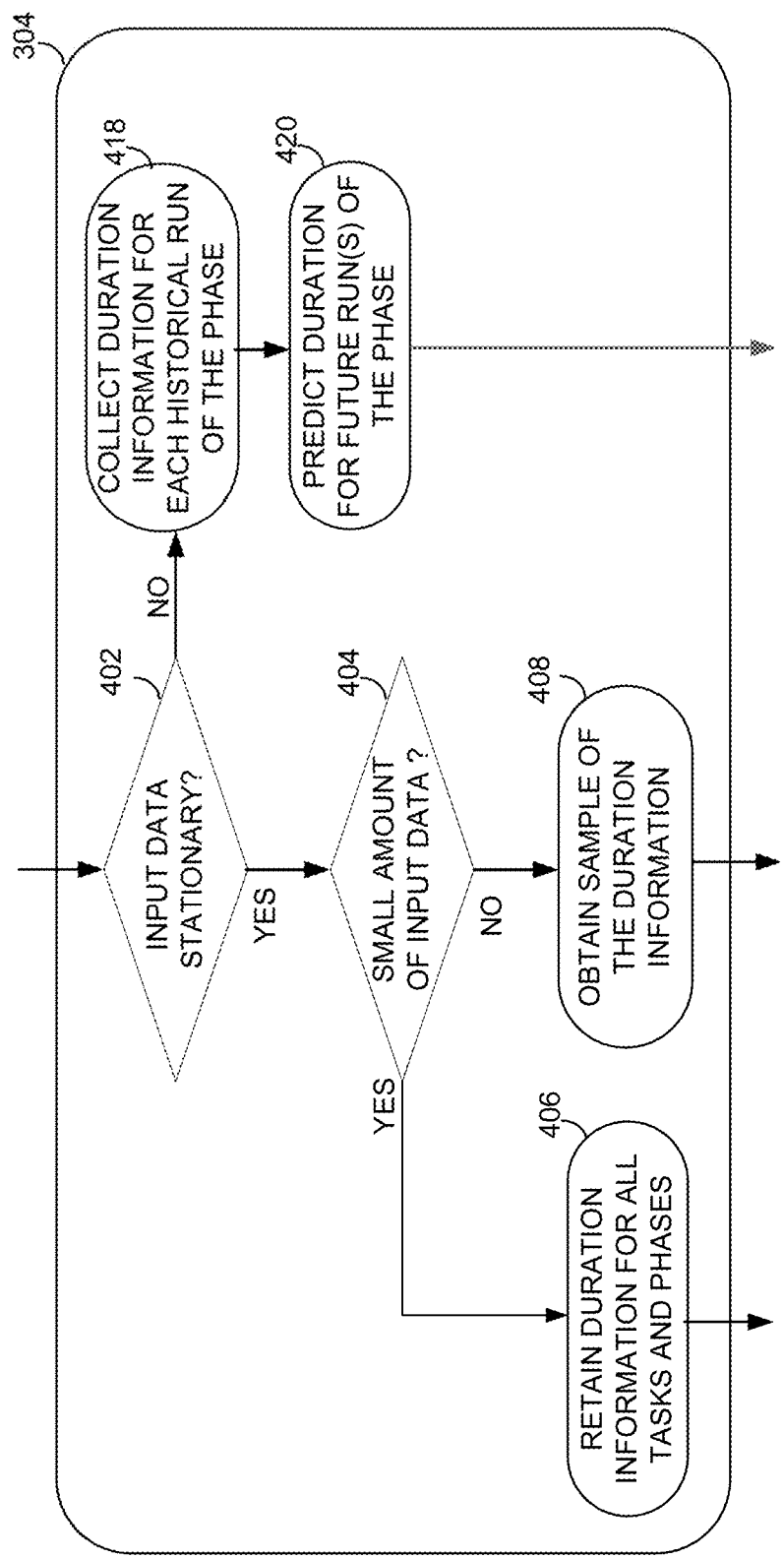
FIG. 4A illustrates a flowchart of the step of FIG. 3 of extracting duration information.

In one embodiment, duration information is extracted at step 304 based on the characteristics of the received input data. The characteristics of the data include, but are not limited to, the amount (for example small versus large) and the type (for example stationary over time versus having time-varying pattern(s)) of the input data. As used herein, an amount of data is referred to as "small" when the data is in an amount below a predetermined threshold whereas an amount of data is referred to as "large" when the data is in an amount above a predetermined threshold. In one embodiment, the threshold is set to a value below which all the input data can easily fit into computer memory. As also used herein, "stationary" refers to input data having at least one statistical property, such as mean and/or variance that remains constant over time. This differs from input data exhibiting time-varying pattern(s). As illustrated in FIG. 4A, extracting the duration information at step 304 comprises determining at step 402 whether the input data is stationary, i.e. exhibits no time-varying patterns. Autocorrelation or other suitable analysis techniques from the field of forecasting and time-series analysis may be used at step 402 to determine if the input data is stationary. Alternatively, a user may plot the input data and inspect the latter to see if there are any patterns over time, i.e. patterns which should be exploited in predicting future resource requirements.

Figure 4B:
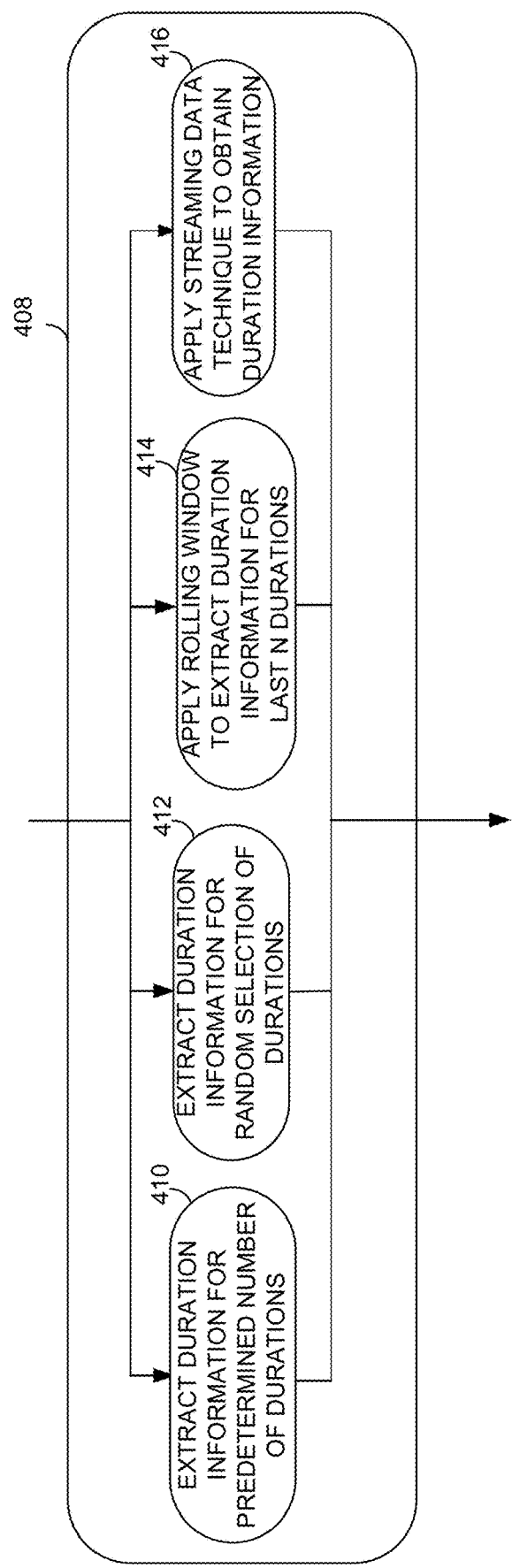
FIG. 4B illustrates a flowchart of the step of FIG. 4A of obtaining a sample of duration information.

If it is determined at step 402 that the input data is stationary, the next step is to determine whether a small amount of input data has been received (step 404). If this is the case, the duration information may be retained for all tasks and all phases (step 406). Otherwise, if it is determined at step 404 that the received input data is not small, a sample of the duration information is obtained at step 408. As illustrated in FIG. 4B, step 408 may comprise extracting the duration information for a predetermined number (N_durations) of durations (step 410), extracting the duration information for a random selection of durations (step 412), applying a rolling window on the duration information to extract the duration information for the last N_durations durations (step 414), or applying a streaming data technique to obtain the duration information (step 416).

In one embodiment, the streaming data technique may be applied at step 416 to maintain the duration information without having to retain the entirety of the input data. The streaming data technique applied at step 416 captures the distribution of the input data approximately by automatically grouping data values into variable sized groups (also referred to as "buckets") of substantially equal weights, each bucket reflecting the summary of the input data available to it.

In one embodiment, percentile duration information is obtained at step 416. As used herein, "percentile duration information" refers to the duration of the tasks expressed in percentiles for each time a given phase runs. In one embodiment, the tasks are divided into several tiers (also referred to as "percentiles"), with the number of tiers being selected to achieve a desired computational precision while reducing computational complexity. For example, with ten (10) tiers being used, percentile information would be obtained at the $10^{th}$ percentile, $20^{th}$ percentile, $30^{th}$ percentile, and so on. The percentiles provide information on a sorted ordering of all durations. For example, the $10^{th}$ percentile value refers to the task duration value that is greater than 10% of all the other duration values, and less than 90% of all the other duration values.

Referring back to FIG. 4A, if the result of the assessment performed at step 402 is negative, meaning that the input data is not stationary, the next step 418 is to collect duration information for each historical run of the phase. In one embodiment, the duration information is collected at step 418 using a standard function from a math library to obtain percentiles. In another embodiment, a streaming data technique, such as the one used at step 416 of FIG. 4B, may apply, especially if each job has a large number of durations. Duration information is then predicted at step 420 for future run(s) of the phase using any suitable technique including, but not limited to, computing statistics such as mean, median, and/or mode of the collected duration information, applying a time series methodology to the collected duration information, and using machine learning. In one embodiment, the duration information collected at step 418 is percentile duration information and a prediction is created at step 420 for each percentile (e.g., for each $10^{th}$ percentile, each $20^{th}$ percentile, etc.). For example, duration information may be collected at step 418 for all percentiles of all 12 PM instances of previous runs of the phase and a prediction for each percentile of a future 12 PM instance of the phase may be made at step 420 by applying any suitable technique on the collected duration information. It should be understood that, although the prediction step 420 is described and illustrated herein as occurring before the task durations are sorted into groups (step 204), an optimal grouping may alternatively be found for all historical runs of the phase prior to predicting the duration information for future run(s).

Figure 5:
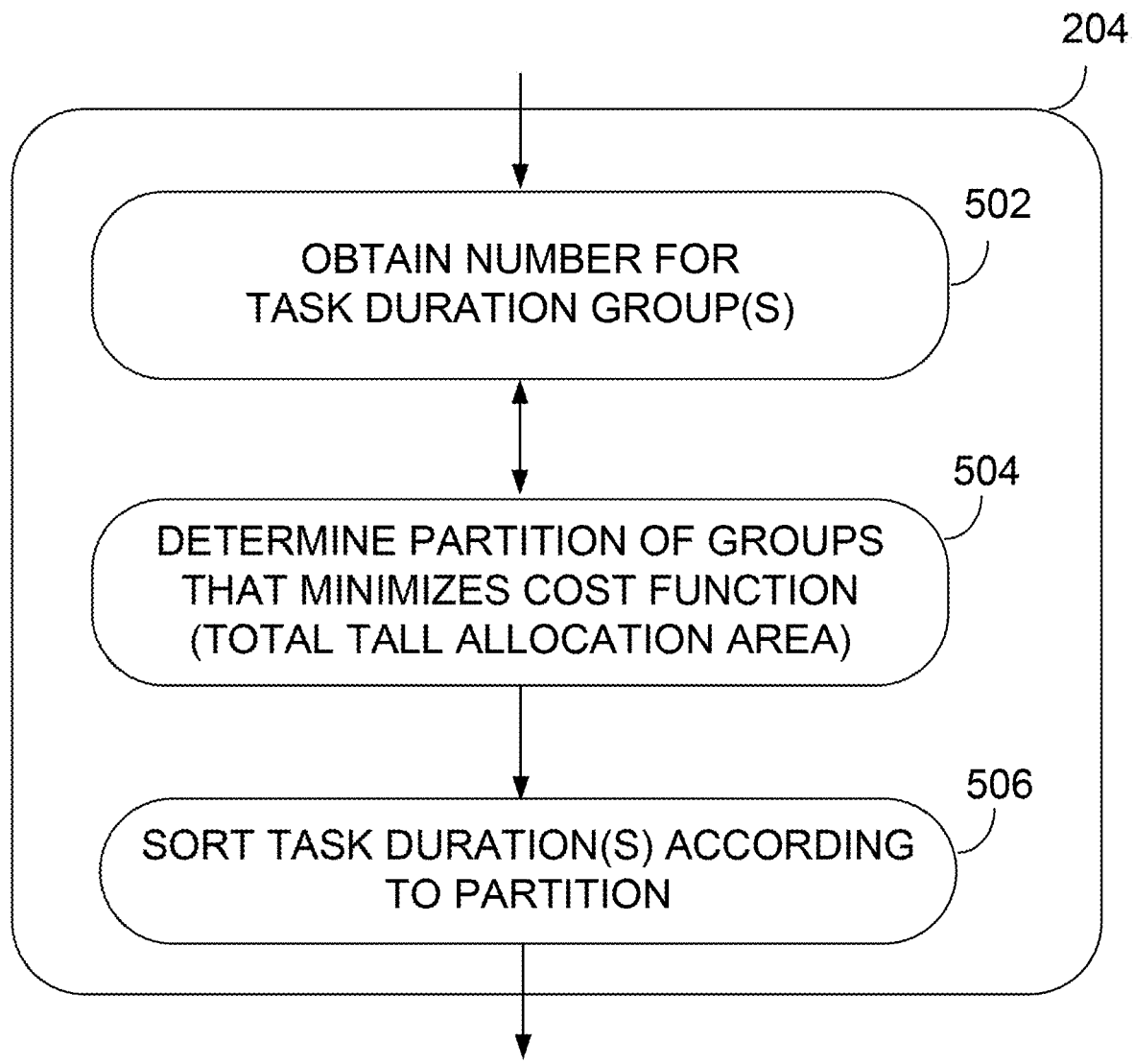
FIG. 5 illustrates a flowchart of the step of FIG. 2 of sorting task durations into group(s)
Figure 6B:
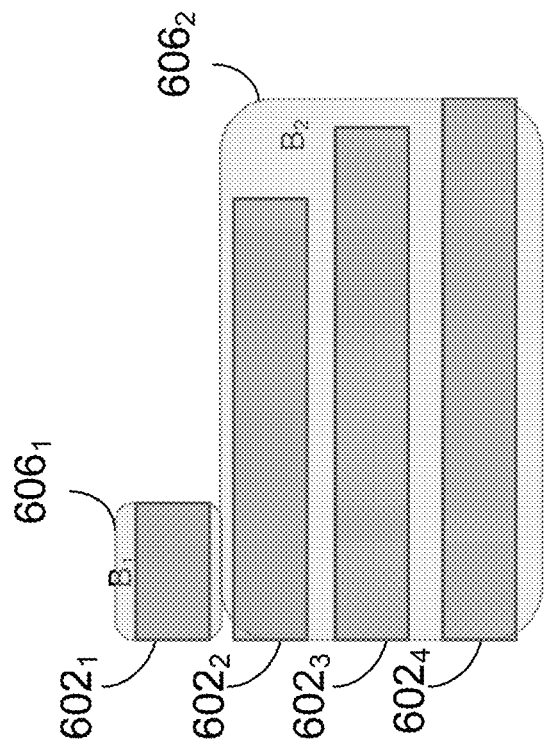
FIG. 6B is a schematic diagram of a task duration grouping, in accordance with a second embodiment.
Figure 6A:
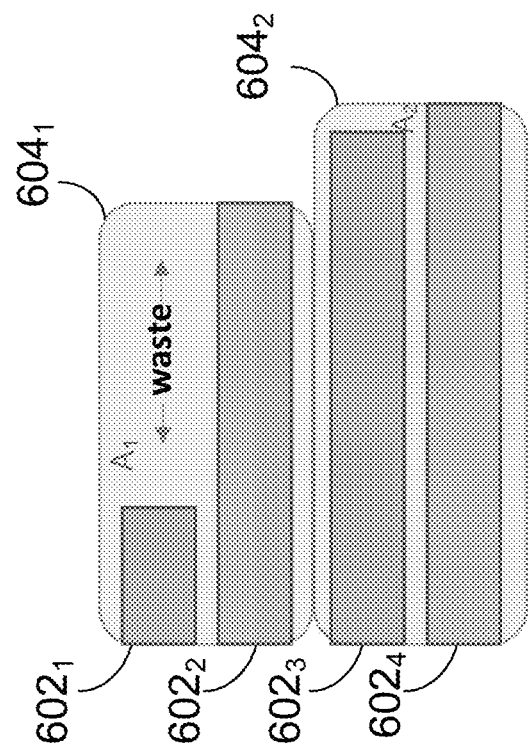
FIG. 6A is a schematic diagram of a task duration grouping, in accordance with a first embodiment.

Referring now to FIG. 5, the step 204 of sorting the task durations into one or more groups comprises obtaining a number for the task duration group(s) (step 502), determining a partition of task duration groups that minimizes a cost function representative of the total tall allocation area (step 504), and sorting the task durations according to the partition (step 506). As used herein, the term "tall allocation area" refers to the overall area of the compute slots that the tasks of a single task duration group are to be performed in, when the tasks all run in parallel (making the allocation "tall"). The term "total tall allocation area" refers to the sum of the tall allocation areas over all task duration groups, with the task duration groups allocated separately. The total tall allocation is illustrated in FIG. 6A and FIG. 6B, where a tall allocation is used to allocate resources to a given phase comprising four (4) tasks having respective durations $602_1$, $602_2$, $602_3$, and $602_4$. As can be seen from FIG. 6A and FIG. 6B, the allocations are tall in the sense that all tasks run in parallel, starting from the beginning of the allocation. Moreover, the width of the allocation is defined by the longest-running task in the given task duration group. In one embodiment, this width is used because, once the task durations are sorted into groups, the individual durations are no longer retained. However, since the maximum duration in each group is retained, it is possible to allocate resources to the group for this duration, knowing that every task in the group will finish by this time.

For example, in FIG. 6A, durations $602_1$ and $602_2$ are sorted into a first group $604_1$ having an allocation area $A_1$, while durations $602_3$ and $602_4$ are sorted into a second group $604_2$ having an allocation area $A_2$, for a total allocation area of $A_{total}=A_1+A_2$. The area $A_1$, $A_2$ of the allocation of each group $604_1$, $604_2$ is equal to the maximum task duration in each group $604_1$, $604_2$ times the number of task durations in each group $604_1$, $604_2$. In FIG. 6B, duration $602_1$ is sorted into a first group $606_1$ having an allocation area $B_1$ while the three remaining durations $602_2$, $602_3$, and $602_4$ are sorted into a second group $606_2$ having an allocation area $B_2$, for a total allocation area of $B_{total}=B_1+B_2$. It can be seen from FIG. 6A and FIG. 6B that there is more waste for the allocation of the first group $604_1$ than for the other groups $604_2$, $606_1$, $606_2$ and the total allocation area $A_{total}$ is greater than the total allocation area $B_{total}$. As used herein, the term "waste" refers to the area that is allocated but not used by any tasks to run in. The partition of task duration groups that minimizes the cost function (and as such minimizes over-reservation waste) is therefore the partition shown in FIG. 6B and no other grouping could minimize the cost function with less waste, i.e. a smaller total tall allocation.

Referring back to FIG. 5, in one embodiment, the number of task duration groups obtained at step 502 is predetermined (for example user-defined). In another embodiment, the number of task duration groups is dynamically computed, as described below with reference to FIG. 7, and steps 502 and 504 are performed concurrently. In this embodiment, step 502 comprises dynamically computing a number of task duration groups that concurrently minimizes the cost function representative of the total tall allocation area while also minimizing the complexity of using a large number of task duration groups. The optimal number of task duration groups is obtained by finding a given number of task duration groups (also referred to as an "elbow" in the cost function) for which little gain in reduction of the cost function is obtained from increasing the number of task duration groups (i.e. using more than the given number of task duration groups).

Figure 7:
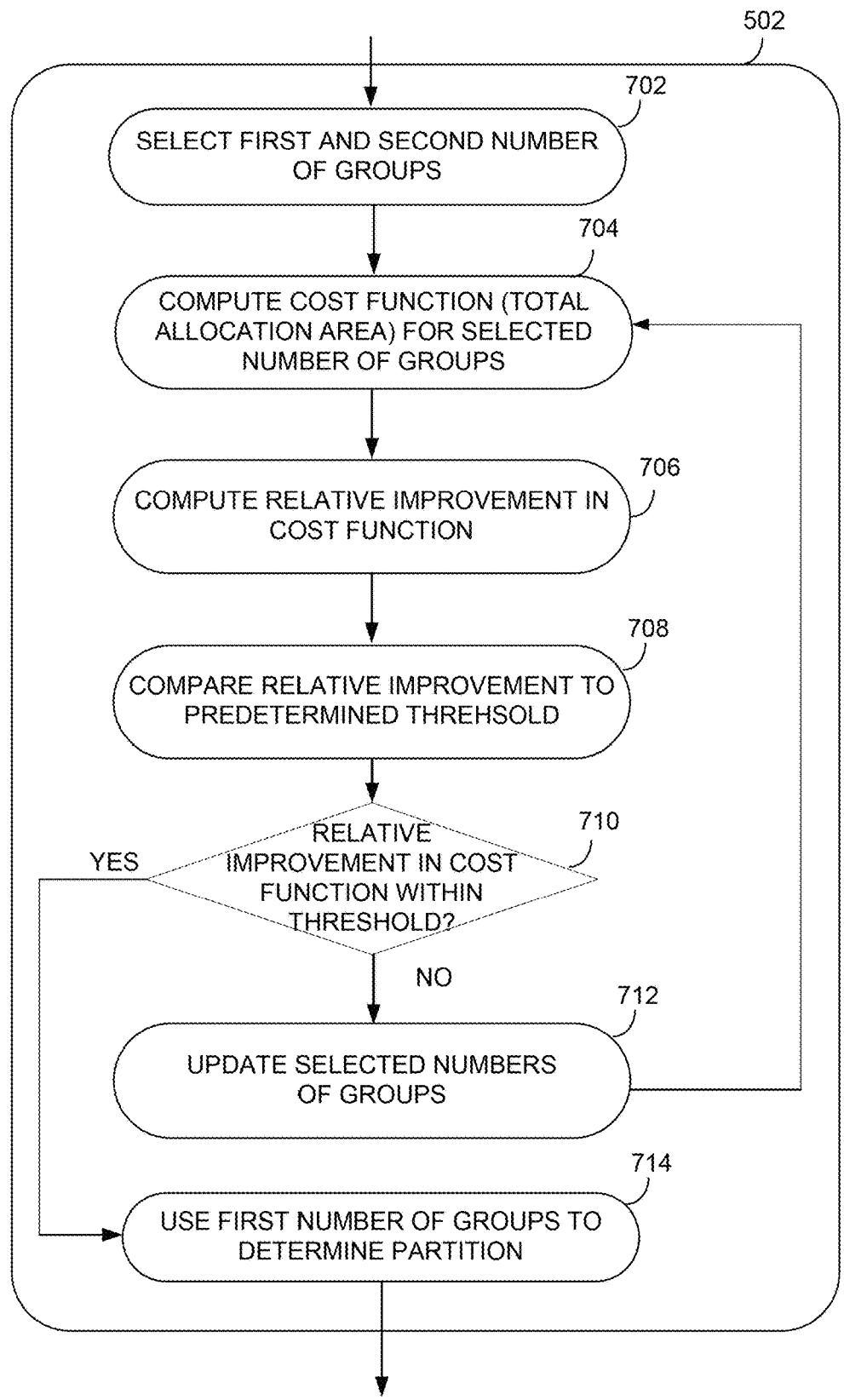
FIG. 7 illustrates a flowchart of the step of FIG. 5 of obtaining a number for the task duration group(s)

As shown in FIG. 7, in one embodiment, step 502 comprises, at step 702, selecting a first number and a second number of task duration groups. The first number of groups may be referred to as a "current best" number and the second number of groups may be referred to as a "proposed increased" number, the current best number of groups being lower than the proposed increased number of groups. The cost function is then computed at step 704 for the selected group numbers by computing the total allocation areas obtained by sorting the tasks according to the first and second number of task duration groups. The relative improvement in the cost function is computed at step 706 by computing the difference between the total allocation areas computed at step 704. The relative improvement is then compared to a predetermined threshold at step 708 and it is assessed at step 710 whether the relative improvement in the cost function is within (e.g. lower than or equal to) the threshold. In one embodiment, the predetermined threshold is 10%. If it is determined at step 710 that the relative improvement in the cost function is within the threshold, it can be concluded that there is little benefit in using a larger number of task duration groups and the first (or current best) number of groups is used to determine the partition of the task duration groups. Otherwise, if the relative improvement in the cost function is beyond (e.g. greater than) the threshold, it can be concluded that there is a worthwhile benefit in using the second (or proposed increased) number of task duration groups. Since there may yet be further gains to come, the selected number of groups are updated at step 712 by setting the previous second (or proposed increased) number of groups as the new first (or current best) number of groups and setting the new second (or proposed increased) number of groups to an incremented version of the previous second (or proposed increased) number of groups. Steps 704 to 710 are then repeated using the updated group numbers. It should be understood that, for efficiency, there may be no need to re-compute the cost function for the first (or current best) number of groups at step 704, since the cost function may have been computed on the previous iteration.

For example, the increment may be one (1), the first (or current best) number of groups may be set to one (1), and the second (or proposed increased) number of groups may be set to two (2) (step 702). The total allocation area obtained using one task duration group and the total allocation area obtained using two task duration groups are then computed and the difference between the two total allocation areas is calculated to determine the relative improvement in the cost function (steps 704 and 706). The relative improvement in the cost function is then compared to a predetermined threshold (step 708). If it is determined at step 710 that the relative improvement in the cost function is within the threshold, it can be concluded that the optimum number of groups is one and this number is used to determine the partition. If it is determined at step 710 that the relative improvement in the cost function is beyond the threshold, it can be concluded that sufficient gain is obtained from using two groups. The first number of groups may then be set to two and the second number of groups incremented to three (step 712) and steps 704 to 710 repeated to determine the gain obtained from using three groups instead of two. The procedure is repeated until the optimum number of groups is found.

Referring back to FIG. 5, in one embodiment where a tall resource allocation is used, the partition of the task duration groups is determined at step 504 by minimizing the following cost function using any suitable technique:

$$\text{Cost} = \sum_i \text{MAX}[i] * N[i] \qquad (1)$$

where Cost is the cost function (i.e. the total tall allocation area), i=1, ..., nGroups, where nGroups is the number of task duration groups and may be predetermined, MAX[i] is the maximum task duration in group i, and N[i] is the number of tasks in group i. It will be understood that the cost function is the mathematical definition of what was discussed above in reference to the total area in FIG. 6A and FIG. 6B.

In one embodiment, minimizing the cost function comprises successively trying all possible combinations of task group partitions. In another embodiment, the cost function may be minimized recursively. In yet another embodiment, a dynamic programming technique may be used to minimize the cost function. This technique could be applied whether percentile duration, unequally-sized buckets, or actual duration information is obtained. As used herein, the term "actual duration information" refers to the real durations of all the tasks that ran, as opposed to summary or sample information (e.g. percentiles or buckets).

To illustrate the dynamic programming technique, let us consider the case where, after the duration information collection step (step 202 of FIG. 2), the task durations have been split into N_bins bins, e.g. percentiles or buckets, as discussed above (with one duration in each bin for actual durations) The bins are assumed to be in sorted order, from the shortest durations to the longest durations, and indexed with the letter i. In other words, the durations in bin (i) should be shorter than the durations in bin (i+1). Let CNT(i) be the number of durations in bin (i) and MAX(i) the maximum duration in bin(i), the total allocation area when grouping the bins from i to j into one group is equal to:

$$\text{Cost}(i, j) = \text{MAX}(j) * \sum_{m=i \ldots j} CNT(m) \quad (2)$$

where Cost(i,j) is the total tall allocation area (i.e. the cost function) defined over a subset of the bins, i.e. from bin i to bin j, with i=0, ... N_bins−1 and j=i, ... N_bins−1 (N_bins being the number of bins), and the bins being indexed from 0 to N_bins−1, MAX(j) is the maximum task duration in bin j, and CNT(m) is the number of durations in the $m^{th}$ bin. Cost(i,j) is therefore the tall allocation area of a single task duration grouping, where the width of the allocation shape is defined by the longest task of all the bins in the grouping (i.e. the last or $j^{th}$ task, since the bins are in sorted order), and the height of the allocation shape is the sum of all durations across all bins in the grouping.

Still referring to the dynamic programming solution, Cost(i,j) gives a cost (i.e. a total tall allocation area) for a single task duration group. Since it is desirable to minimize the total tall allocation area over all task duration groups, let the minimum total cost (i.e. the minimum total tall allocation area) of grouping bins from i to j into S groups be defined as gc(S,i,j). It should be understood that, since there may be various different ways of grouping the bins from i to j into S groups, the function gc(S,i,j) is defined as the minimum of all such ways.

Recall that nGroups is the predetermined input number of task duration groups to be obtained. By construction, the number of output groups, nGroups, is less than or equal to N_bins, the number of input bins. The overall goal of step 504 can be stated as finding gc(nGroups, 0, N_bins−1), i.e. the minimum cost of dividing the bins from 0 to N_bins−1 into nGroups task duration groups. Dynamic programming is used to compute gc(S,i,j) for i=0, ... N_bins−1 and j=0, ... N_bins−1, starting from S=0. The computation can be described in terms of the following optimal recurrent substructure:

$$gc(S,i,j) = \{\text{Cost}(i,j) \text{ if } S=1, \text{ and } \min_{K=i \ldots j-(S-1)} gc(1,i,K) + gc(S-1,K+1,j) \text{ if } S>1\} \quad (3)$$

In other words, if only one group is present (S=1), the minimum cost gc(S,i,j) is the cost function Cost(i,j). If more than one group is present (S>1), equation (3) implies finding the index value K at which to split the bins into one group (with cost gc(1,i,K)) and into the remaining S−1 groups (with cost gc(S−1,K+1,j)). The cost of gc(S,i,j) is thus computed as the sum of the cost of the single group over some bins from i to K and the recursively-computed cost of the remaining groups over the remaining bins, from K+1 to j. It should be understood that techniques, including, but not limited to, recursion and brute force, other than dynamic programming may be used. Still, in one embodiment, using dynamic programming may alleviate the need for having to repeatedly re-compute the same values.

As is standard in dynamic programming, for one particular value of S, the function gc(S,i,j) can be seen as a matrix with rows indexed by i=0 ... N_bins−1 and columns indexed by j=0 ... N_bins−1. In order to compute the values of each matrix once, the matrix gc(1,i,j) is first computed, followed by the matrix gc(2,i,j) (recursively using values from gc(1,i,j)), the matrix gc(3,i,j) (recursively using values from both gc(1,i,j) and gc(2,i,j)), and so on, until the matrix gc(nGroups,i,j) is obtained. The sought after solution gc(nGroups,0,N_bins−1) can be read from the final matrix gc(nGroups,i,j). The partition (i.e. the values of K) that led to the optimal solution gc(nGroups,0,N_bins−1) may then be stored in memory using any suitable means. It should be understood that, as discussed above, gc(nGroups,0,N_bins−1) only provides the minimum value of the function gc(S,i,j) and does not provide the grouping that achieves this value.

Referring back to FIG. 2, once the partition that minimizes the total tall allocation area has been found and the task durations have been sorted into groups accordingly, a resource requirement is defined for each task duration group (step 206), so that the specifications over all task duration groups provides a specification of the resources required for each phase, and over all the phases, for each job. In one embodiment, step 206 comprises specifying, based on the duration information, a total number of tasks, an average task duration, and a maximum task duration for each of the groups. As previously discussed, the purpose of the resource specification (step 206) is to help plan for and reserve the appropriate amount of resources to run the job at some point in the future. However, as also discussed above, some of the duration information obtained at step 202 may reflect information aggregated over multiple historical runs or may be a sample of the input data obtained from historical runs of a given phase of a job. The task duration groups may therefore only reflect the correct distribution or shape of the durations of a phase, but not the total number of tasks that will occur in each phase. Since the total number of tasks is used as part of the resource specification, step 206 illustratively comprises predicting the actual number of tasks for each duration group. In one embodiment, the total number of tasks for the phase is predicted over all the task duration groups and the task duration groups are scaled so that the number of durations in each task duration group adds up to the predicted total. In another embodiment, the number of task durations in each task duration group is predicted separately. In either case, the number of tasks can be predicted at step 206 using any suitable technique including, but not limited to, computing statistics such as mean, median, and/or mode of the historical number of tasks, applying a time series methodology to the collected task number information, and using machine learning.

Figure 8:
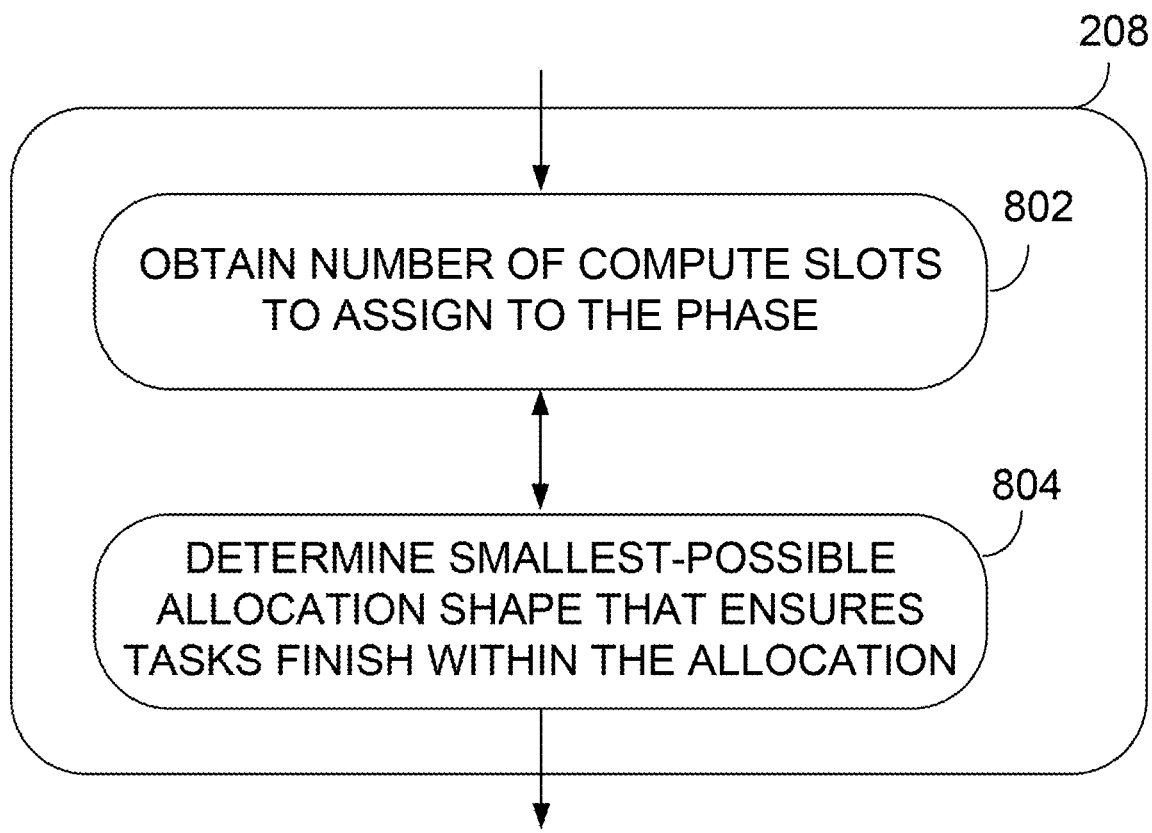
FIG. 8 illustrates a flowchart of the step of FIG. 2 of determining a resource allocation for the phase.

Referring now to FIG. 8 in addition to FIG. 2, once the resource requirement has been defined, determining the resource allocation for the phase (step 208) comprises obtaining a number (K) of compute slots to assign to the phase (step 802) and determining the smallest-possible allocation shape (i.e. the allocation shape that results in the least amount of over-reservation waste) that ensures that tasks will finish within the allocation (step 804).

In one embodiment, the number of compute slots is obtained at step 802 from user input. In another embodiment, step 802 comprises finding the optimum number of compute slots (e.g. the height of the allocation shape when a tall allocation is used) that will allow the phase to fit as soon as possible in the overall allocation plan. In this case, steps 802 and 804 may be performed concurrently. For this purpose, step 802 may comprise determining allocation shapes for different values of K, the tasks running in one or more waves for each allocation shape, and selecting among these allocation shapes the one, which has the earliest completion time when placed in the allocation plan in the earliest position possible.

Figure 9:
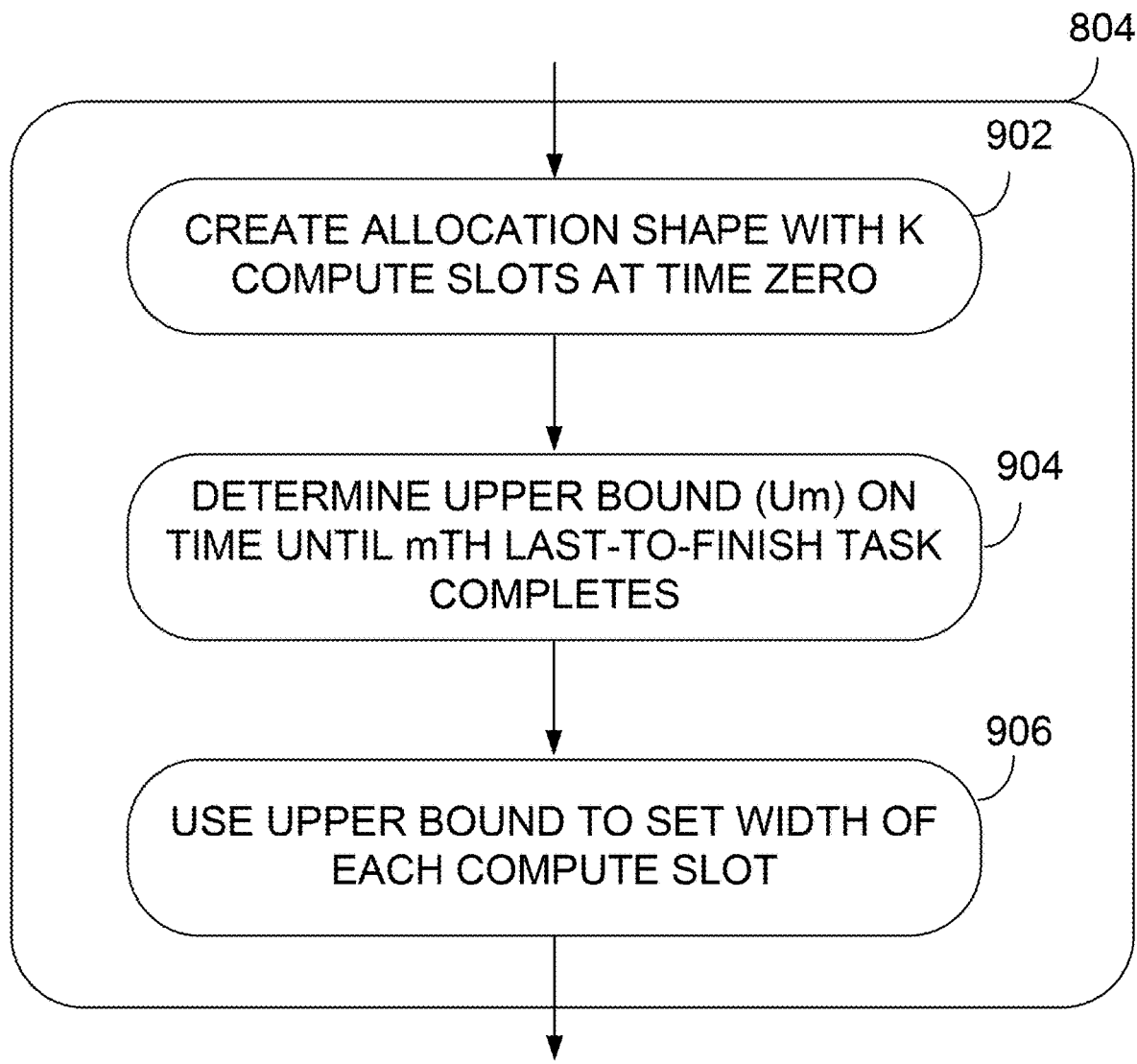
FIG. 9 illustrates a flowchart of the step of FIG. 8 of selecting a smallest-possible allocation shape, in accordance with a first embodiment.

In one embodiment, the resource requirement specification defined at step 206 can be used to determine at step 804 the smallest-possible allocation shape that ensures that all tasks finish within the allocation. A resource allocation illustratively begins at time zero with a certain number of parallel slots, K, where the value of K can be viewed as the initial height of the allocation shape. An allocation shape may then be seen as a rectangle of height K and width W. It should however be understood that the allocation may have any suitable shape other than a rectangle. For example, the resource allocation may comprise K compute slots for 10 seconds, K−1 compute slots for another 10 seconds, K−2 compute slots for another 10 seconds, and so on. As illustrated in FIG. 9, a proposed approach to determining the smallest-possible allocation shape starts with providing K compute slots at time zero (step 902) and seeks to find the width of each of the K compute slots (i.e. the allocation durations). In other words, in one embodiment, it is proposed to determine the amount of time for which the K slots, K−1 slots, etc., are needed in order for all the tasks to complete. In order to find the allocation durations at step 804, an upper bound on the amount of time until a given last-to-finish task completes (e.g., the $3^{rd}$-last-to-finish, or the $7^{th}$-last-to-finish task) is determined at step 904. The upper bound determined at step 904 may then be used to set the width of each compute slot (step 906).

Let $U_m$ denote the time until the $m^{th}$ last-to-finish task completes The upper bound ($U_m$) on the time until the $m^{th}$ last-to-finish task completes can be computed at step 904 as follows:

$$U_m=(N\mu-m\lambda_m)/K+\lambda_m \qquad (4)$$

where N is the total number of tasks, p is the overall average task duration (over all the task duration groups), K is the total number of compute slots available for allocation, and $\lambda_m$ is the duration of the $m^{th}$ longest task.

The allocation shape can then be specified such that compute slot m is allocated for $U_m$, with m=1 . . . K (step 906). In other words, each of the K compute slots is allocated for a different amount of time, where the time is specified using the formula for $U_m$. The intuition is that once the $m^{th}$ last-to-finish task is done, we no longer need the $m^{th}$ compute slot (as there are no tasks left to run on this slot, just m−1 tasks running on other slots). It should be understood that an approximate duration may be used as the value for $\lambda_m$ in equation (4), the approximate duration obtained from the resource requirement specification. For example, the task duration group that the $m^{th}$ longest task would be a part of may be determined (since the number of durations in each task duration group is known and the durations in each task duration group are in sorted order of duration), and the maximum duration of this task duration group may then be used as the value $\lambda_m$.

Figure 10:
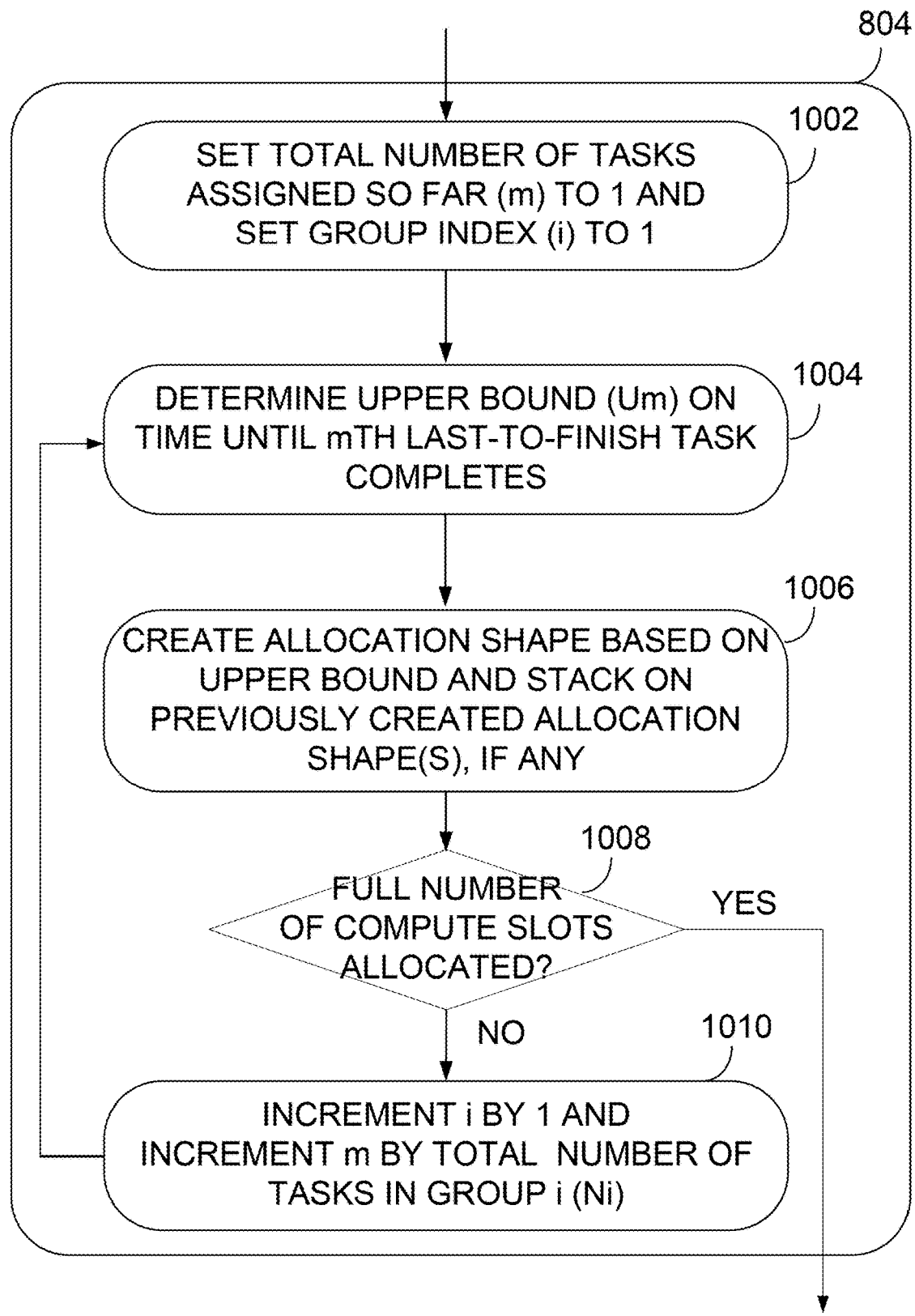
FIG. 10 illustrates a flowchart of the step of FIG. 8 of selecting a smallest-possible allocation shape, in accordance with a second embodiment.

Referring now to FIG. 10, in another embodiment, instead of selecting a different duration (i.e. width) for each of the K compute slots (as illustrated in FIG. 9), the smallest-possible allocation shape is determined at step 804 by selecting a duration for a group of slots, in accordance with the number of the task duration groups. For this purpose, step 804 comprises setting to one (1) the total number (m) of tasks so far assigned in the allocation plan and setting the group index (i) to one (1) (step 1002). An upper bound ($U_m$) on the time until the $m^{th}$ last-to-finish task completes is then determined at step 1004, using the aforementioned formula for $U_m$ (as per equation (4)).

At step 1006, an allocation shape is created based on the upper bound and the allocation shape is stacked on previously created allocation shape(s), if any. The allocation shape is created so as to have a width of $U_m$ and a height defined as follows:

$$\text{height}=\min(K-m+1,N_i) \qquad (5)$$

where $N_i$ is the total number of tasks in the group i.

It is then determined at step 1008 whether the full number of compute slots has been allocated (i.e. whether m is greater than K). If this is the case, step 804 ends. Otherwise (i.e. m is lower than or equal to K), the group index i is incremented by a predetermined step (e.g. one (1)), m is incremented by $N_i$ and steps 904, 906, and 908 are repeated.

Figure 11:
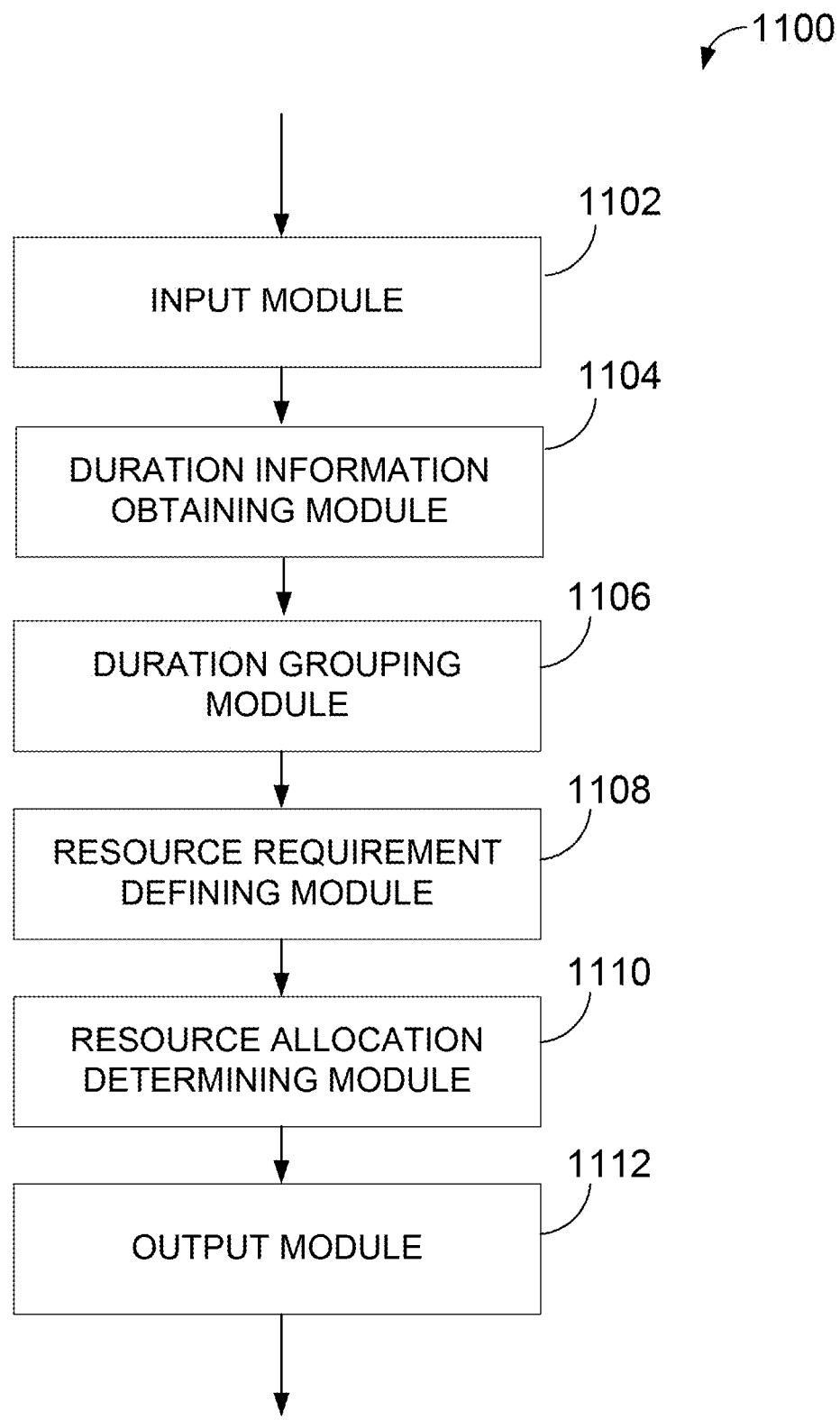
FIG. 11 is a block diagram of an example system for resource requirement and resource allocation definition in a distributed computing system, in accordance with one embodiment.

Referring now to FIG. 11, an example system 1100 for resource requirement and resource allocation definition in a distributed computing system, in accordance with one embodiment, will now be described. The system 1100 implements the method described above with reference to FIG. 2, FIG. 3, FIG. 4A, FIG. 4B, FIG. 5, FIG. 7, FIG. 8, FIG. 9, and FIG. 10. For this purpose, the system 1100 comprises an input module 1102, a duration information obtaining module 1104, a duration grouping module 1106, a resource requirement defining module 1108, a resource allocation determining module 1110, and an output module 1112. Input data is received at the input module 1102 and the duration information obtaining module 1104 extracts duration information from the input data by implementing the steps described above with reference to FIG. 3 and FIG. 4A and FIG. 4B. The duration grouping module 1106 then groups the task durations. The resource requirement defining module 1108 defines a resource requirement for the phase and the resource allocation determining module 1110 creates a resource allocation shape, which is then output (to a resource manager for example) by the output module 1112 for execution of the tasks according to the planned resource allocation.

In one embodiment, the resource requirement defining module 1108 is implemented in the resource requirement determiner (reference 106 of FIG. 1A) and the resource allocation determining module 1110 is implemented in the resource planner (reference 108 of FIG. 1A).

Figure 12:
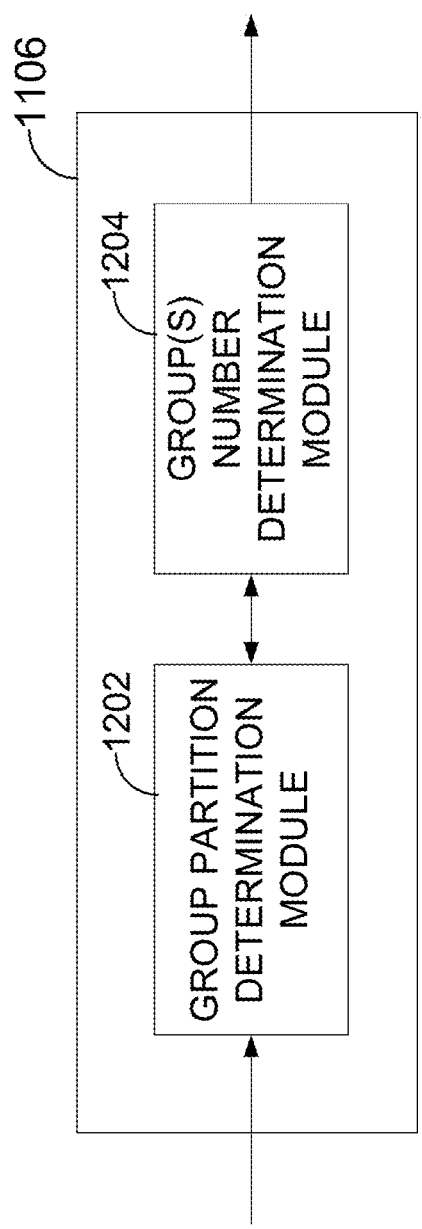
FIG. 12 is a block diagram of the duration grouping module of FIG. 11.

Referring to FIG. 12 in addition to FIG. 11, the duration grouping module 1106 comprises a group partition determination module 1202 and a group(s) number determination module 1204. The group partition determination module 1202 determines the partition of task duration groups that minimizes the cost function representative of the total resource allocation area. This is using the techniques described above with reference to step 504 of FIG. 5. The group(s) number determination module 1204 dynamically determines an optimum number for the task duration group(s), i.e. a given number of task duration group(s) for which little gain in reduction of the cost function is obtained from using more than the given number of task duration group(s). This is achieved by implementing the method steps described above with reference to FIG. 5 and FIG. 7.

Figure 13:
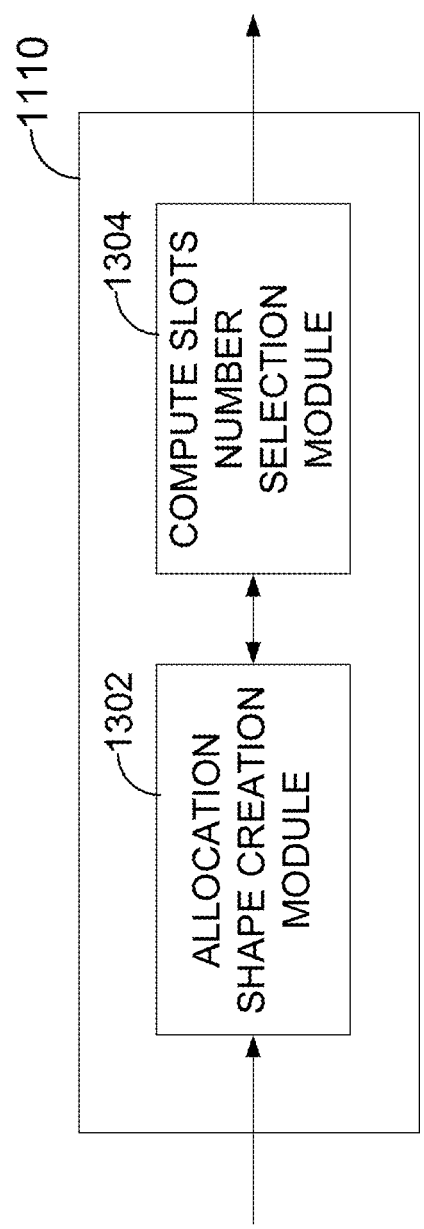
FIG. 13 is a block diagram of the resource allocation determining module of FIG. 11.

Referring to FIG. 13, the resource allocation determining module 1110 comprises an allocation shape creation module 1302 and a compute slots number selection module 1304. The allocation shape creation module 1302 determines the smallest-possible allocation shape (i.e. the allocation shape that results in the least amount of over-reservation waste) that ensures that tasks will finish within the allocation (step 804). This is achieved by implementing the method steps described above with reference to FIG. 9 and FIG. 10. The compute slots number selection module 1304 determines the optimum number of compute slots that will allow the phase to fit as soon as possible in the overall allocation plan. This is achieved using the technique(s) described above with reference to step 802 of FIG. 8.

Figure 14:
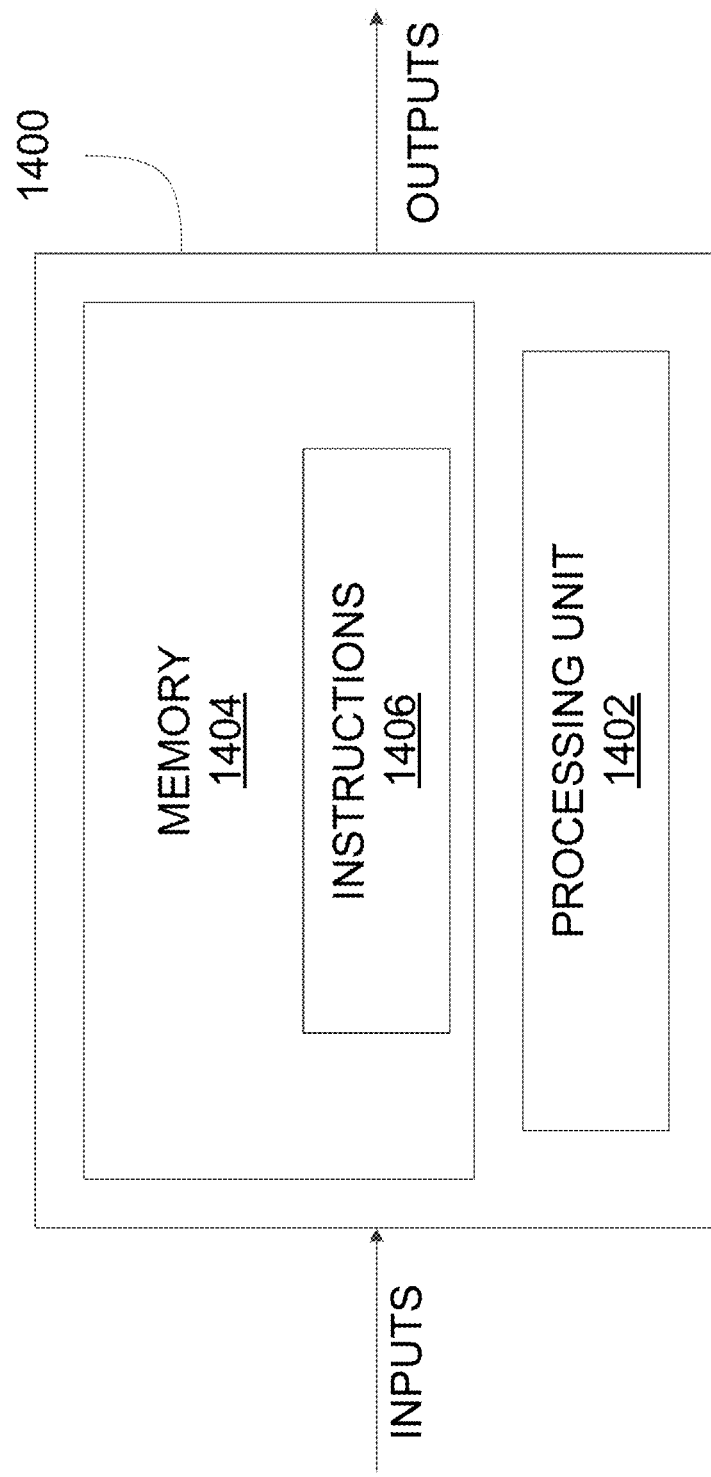
FIG. 14 is a block diagram of an example computing device for implementing the system of FIG. 11.

FIG. 14 is an example embodiment of a computing device 1400 for implementing the system 1100 described above with reference to FIG. 11, FIG. 12, and FIG. 13. The computing device 1400 may be referred to as a node configured to perform resource requirement definition and resource allocation. The computing device 1400 may be connected to and perform scheduling of phases on one or more other computing devices (also referred to as "nodes") of the compute cluster that makes up the distributed computing system. The computing device 1400 comprises a processing unit 1402 and a memory 1404 which has stored therein computer-executable instructions 1406. The processing unit 1402 may comprise any suitable devices configured to cause a series of steps to be performed such that instructions 1406, when executed by the computing device 1400 or other programmable apparatus, may cause the functions/acts/steps specified in the methods described herein to be executed. The processing unit 1402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 1404 may comprise any suitable known or other machine-readable storage medium. The memory 1404 may comprise non-transitory computer readable storage medium, for example, but not limited to, an electronic, magnetic, optical, electromagnetic, infrared, or semiconductor system, apparatus, or device, or any suitable combination of the foregoing. The memory 1404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1404 may comprise any storage means (e.g., devices) suitable for retrievably storing machine-readable instructions 1406 executable by processing unit 1402.

In one embodiment, the computing device 1400 is used for implementing the resource requirement determiner 106 and the resource planner 108 of FIG. 1A.

In one embodiment, using the herein described system and method for resource requirement and resource allocation definition allows to sort task durations into groups quickly, thus reducing the overhead associated with the task duration grouping process and ensuring adequate system performance. In addition, planning, shaping, and allocating resources can be performed efficiently because the number of task duration groups is selected dynamically and is only increased if such an increase leads to a significant reduction in over-reservation waste. Also, using task duration groups, it becomes possible to ensure that tasks finish within their allocation while minimizing over-reservation waste.

The above description is meant to be for purposes of example only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

Although illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Based on such understandings, the technical solution of the present invention may be embodied in the form of a software product. The software product may be stored in a non-volatile or non-transitory storage medium, which can be a read-only memory (ROM), a magnetic disk, an optical disc, a flash drive, or any other suitable storage media or device.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. The software product includes a number of instructions that enable a computer device (personal computer, server, or network device) to execute the methods provided in the embodiments of the present invention. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The structure illustrated is thus provided for efficiency of teaching the present embodiment. The present disclosure may be embodied in other specific forms without departing from the subject matter of the claims.

Also, one skilled in the relevant arts will appreciate that although the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A computer-implemented method comprising:
obtaining duration information indicative of an amount of time taken by each of one or more tasks of a distributed compute phase of a distributed compute job to be executed in a distributed compute cluster;
sorting the one or more tasks into one or more groups based on the duration information, and determining a resource requirement for each of the one or more groups; and
determining, based on the resource requirement for each of the one or more groups, a time-varying allocation of resources of the distributed compute cluster for the distributed compute phase; and
wherein obtaining the duration information comprises obtaining input data from one or more historical runs of the distributed compute phase and extracting the duration information from the input data; and
wherein the input data is stationary over time and an amount of the input data is above a predetermined threshold and further wherein extracting the duration information comprises applying a streaming data technique to obtain tiered duration information.

2. The computer-implemented method of claim 1, wherein the input data is stationary over time and an amount of the input data is below a predetermined threshold and further wherein the duration information is extracted for all of the one or more tasks.

3. The computer-implemented method of claim 1, wherein the input data is stationary over time and an amount of the input data is above a predetermined threshold and further wherein the duration information is extracted for a random selection of durations associated with the one or more tasks.

4. The computer-implemented method of claim 1, wherein the input data is stationary over time and an amount of the input data is above a predetermined threshold and further wherein the duration information is extracted for a predetermined number of durations associated with the one or more tasks.

5. The computer-implemented method of claim 1, wherein the input data exhibits at least one time-varying pattern and further wherein extracting the duration information comprises:
obtaining, from the input data, historical percentile duration information for each of the one or more historical runs of the distributed compute phase; and
forecasting, based on the historical percentile duration information, predicted percentile duration information for at least one future run of each phase.

6. The computer-implemented method of claim 1, wherein the one or more tasks are to be performed in one or more compute slots and further wherein sorting the one or more tasks into the one or more groups comprises determining a partition of the one or more groups that meets a desired number for the one or more groups and minimizes a total area of the one or more compute slots.

7. The computer-implemented method of claim 6, wherein determining the partition of the one or more groups comprises applying a dynamic programming technique to minimize a cost function representative of the total area.

8. The computer-implemented method of claim 6, wherein sorting the one or more tasks into the one or more groups comprises:
(a) computing a first total area of the one or more compute slots with the one or more tasks sorted into a first number of the one or more groups;
(b) incrementing the first number by a predetermined step, thereby obtaining a second number for the one or more groups;
(c) computing a second total area of the one or more compute slots with the one or more tasks sorted into the second number of the one or more groups;
(d) computing a difference between the first total area and the second total area and comparing the difference to a predetermined threshold;
(e) responsive to determining that the difference is within the predetermined threshold, setting the first number as the desired number; and
(f) responsive to determining that the difference is beyond the predetermined threshold, incrementing the second number by the predetermined step, thereby obtaining a third number for the one or more groups, setting the second number as the first number, setting the third number as the second number, and repeating steps (a) to (f).

9. The computer-implemented method of claim 1, wherein determining the resource requirement comprises determining, for each of the one or more groups, a number of the one or more tasks, an average task duration, and a maximum task duration.

10. The computer-implemented method of claim 1, wherein determining the time-varying allocation of the resources for the distributed compute phase comprises, for each of the one or more groups:
determining an upper bound on a time until completion of a given one of the one or more tasks that is last to finish; and
creating, based on the upper bound, a two-dimensional shape representative of an allocation of resources for the distributed compute phase, the two-dimensional shape having a width equal to a value of the upper bound.

11. The computer-implemented method of claim 1, further comprising receiving the distributed compute job from a job submitter.

12. The computer-implemented method of claim 1, further comprising outputting the time-varying allocation of the resources to a resource planner for planning execution of the distributed compute job in the distributed compute cluster.

13. A computing device comprising:
at least one processing unit; and
a non-transitory memory communicatively coupled to the at least one processing unit and storing computer-readable program instructions executable by the at least one processing unit for:
obtaining duration information indicative of an amount of time taken by each of one or more tasks of a distributed compute phase of a distributed compute job to be executed in a distributed compute cluster,
sorting the one or more tasks into one or more groups based on the duration information, and determining a resource requirement for each of the one or more groups, and
determining, based on the resource requirement for each of the one or more groups, a time-varying allocation of resources of the distributed compute cluster for the distributed compute phase; and
wherein the computer-readable program instructions are executable by the at least one processing unit for obtaining input data from one or more historical runs of the distributed compute phase and extracting the duration information from the input data; and wherein the input data is stationary over time and an amount of the input data is above a predetermined threshold and further wherein the computer-readable program instructions are executable by the at least one processing unit for applying a streaming data technique to obtain tiered duration information.

14. The computing device of claim 13, wherein the input data is stationary over time and an amount of the input data is below a predetermined threshold and further wherein the computer-readable program instructions are executable by the at least one processing unit for extracting the duration information for all of the one or more tasks.

15. The computing device of claim 13, wherein the input data is stationary over time and an amount of the input data is above a predetermined threshold and further wherein the computer-readable program instructions are executable by the at least one processing unit for extracting the duration information for a random selection of durations associated with the one or more tasks.

16. The computing device of claim 13, wherein the input data is stationary over time and an amount of the input data is above a predetermined threshold and further wherein the computer-readable program instructions are executable by the at least one processing unit for extracting the duration information for a predetermined number of durations associated with the one or more tasks.

17. The computing device of claim 13, wherein the input data exhibits at least one time-varying pattern and further wherein the computer-readable program instructions are executable by the at least one processing unit for extracting the duration information comprising:
    obtaining, from the input data, historical percentile duration information for each of the one or more historical runs of the distributed compute phase; and
    forecasting, based on the historical percentile duration information, predicted percentile duration information for at least one future run of each phase.

18. The computing device of claim 13, wherein the one or more tasks are to be performed in one or more compute slots and further wherein sorting the one or more tasks into the one or more groups comprises determining a partition of the one or more groups that meets a desired number for the one or more groups and minimizes a total area of the one or more compute slots.

19. The computing device of claim 18, wherein the computer-readable program instructions are executable by the at least one processing unit for applying a dynamic programming technique to minimize a cost function representative of the total area.

20. The computing device of claim 18, wherein sorting the one or more tasks into the one or more groups comprises:
    (a) computing a first total area of the one or more compute slots with the one or more tasks sorted into a first number of the one or more groups;
    (b) incrementing the first number by a predetermined step, thereby obtaining a second number for the one or more groups;
    (c) computing a second total area of the one or more compute slots with the one or more tasks sorted into the second number of the one or more groups;
    (d) computing a difference between the first total area and the second total area and comparing the difference to a predetermined threshold;
    (e) responsive to determining that the difference is within the predetermined threshold, setting the first number as the desired number; and
    (f) responsive to determining that the difference is beyond the predetermined threshold, incrementing the second number by the predetermined step, thereby obtaining a third number for the one or more groups, setting the second number as the first number, setting the third number as the second number, and repeating steps (a) to (f).

21. The computing device of claim 13, wherein the computer-readable program instructions are executable by the at least one processing unit for defining the resource requirement comprising specifying, for each of the one or more groups, a number of the one or more tasks, an average task duration, and a maximum task duration.

22. The computing device of claim 13, wherein determining the time-varying allocation of the resources for the distributed compute phase comprises, for each of the one or more groups:
    determining an upper bound on a time until completion of a given one of the one or more tasks that is last to finish; and
    creating, based on the upper bound, a two-dimensional shape representative of an allocation of resources for the distributed compute phase, the two-dimensional shape having a width equal to a value of the upper bound.

23. The computing device of claim 13, wherein the computer-readable program instructions are executable by the at least one processing unit for receiving the distributed compute job from a job submitter.

24. The computing device of claim 13, wherein the computer-readable program instructions are executable by the at least one processing unit for outputting the time-varying allocation of the resources to a resource planner for planning execution of the distributed compute job in the distributed compute cluster.

25. A non-transitory computer readable medium having stored thereon program code, the program code executable by a processor for:
    obtaining duration information indicative of an amount of time taken by each of one or more tasks of a distributed compute phase of a distributed compute job to be executed in a distributed compute cluster;
    sorting the one or more tasks into one or more groups based on the duration information, and determining a resource requirement for each of the one or more groups; and
    determining, based on the resource requirement, a time-varying allocation of resources of the distributed compute cluster for the distributed compute phase; and
    wherein obtaining the duration information comprises obtaining input data from one or more historical runs of the distributed compute phase and extracting the duration information from the input data; and
    wherein the input data is stationary over time and an amount of the input data is above a predetermined threshold and further wherein extracting the duration information comprises applying a streaming data technique to obtain tiered duration information.

26. A computer-implemented method comprising:
    obtaining duration information indicative of an amount of time taken by each of one or more tasks of a distributed compute phase of a distributed compute job to be executed in a distributed compute cluster;

sorting the one or more tasks into one or more groups based on the duration information, and determining a resource requirement for each of the one or more groups; and determining, based on the resource requirement for each of the one or more groups, a time-varying allocation of resources of the distributed compute cluster for the distributed compute phase; and wherein the one or more tasks are to be performed in one or more compute slots and further wherein sorting the one or more tasks into the one or more groups comprises determining a partition of the one or more groups that meets a desired number for the one or more groups and minimizes a total area of the one or more compute slots; and wherein sorting the one or more tasks into the one or more groups comprises:

(a) computing a first total area of the one or more compute slots with the one or more tasks sorted into a first number of the one or more groups;

(b) incrementing the first number by a predetermined step, thereby obtaining a second number for the one or more groups;

(c) computing a second total area of the one or more compute slots with the one or more tasks sorted into the second number of the one or more groups;

(d) computing a difference between the first total area and the second total area and comparing the difference to a predetermined threshold;

(e) responsive to determining that the difference is within the predetermined threshold, setting the first number as the desired number; and (f) responsive to determining that the difference is beyond the predetermined threshold, incrementing the second number by the predetermined step, thereby obtaining a third number for the one or more groups, setting the second number as the first number, setting the third number as the second number, and repeating steps (a) to (f).

27. The computer-implemented method of claim 26, wherein determining the partition of the one or more groups comprises applying a dynamic programming technique to minimize a cost function representative of the total area.

28. A computer-implemented method comprising:

obtaining duration information indicative of an amount of time taken by each of one or more tasks of a distributed compute phase of a distributed compute job to be executed in a distributed compute cluster;

sorting the one or more tasks into one or more groups based on the duration information, and determining a resource requirement for each of the one or more groups; and determining, based on the resource requirement for each of the one or more groups, a time-varying allocation of resources of the distributed compute cluster for the distributed compute phase; and wherein determining the time-varying allocation of the resources for the distributed compute phase comprises, for each of the one or more groups:

determining an upper bound on a time until completion of a given one of the one or more tasks that is last to finish; and creating, based on the upper bound, a two-dimensional shape representative of an allocation of resources for the distributed compute phase, the two-dimensional shape having a width equal to a value of the upper bound.

29. The computer-implemented method of claim 28, wherein obtaining the duration information comprises obtaining input data from one or more historical runs of the distributed compute phase and extracting the duration information from the input data.

30. A computing device comprising:

at least one processing unit; and a non-transitory memory communicatively coupled to the at least one processing unit and storing computer-readable program instructions executable by the at least one processing unit for:

obtaining duration information indicative of an amount of time taken by each of one or more tasks of a distributed compute phase of a distributed compute job to be executed in a distributed compute cluster, sorting the one or more tasks into one or more groups based on the duration information, and determining a resource requirement for each of the one or more groups, and determining, based on the resource requirement for each of the one or more groups, a time-varying allocation of resources of the distributed compute cluster for the distributed compute phase; and wherein the one or more tasks are to be performed in one or more compute slots and further wherein sorting the one or more tasks into the one or more groups comprises determining a partition of the one or more groups that meets a desired number for the one or more groups and minimizes a total area of the one or more compute slots; and wherein sorting the one or more tasks into the one or more groups comprises:

(a) computing a first total area of the one or more compute slots with the one or more tasks sorted into a first number of the one or more groups;

(b) incrementing the first number by a predetermined step, thereby obtaining a second number for the one or more groups;

(c) computing a second total area of the one or more compute slots with the one or more tasks sorted into the second number of the one or more groups;

(d) computing a difference between the first total area and the second total area and comparing the difference to a predetermined threshold;

(e) responsive to determining that the difference is within the predetermined threshold, setting the first number as the desired number; and (f) responsive to determining that the difference is beyond the predetermined threshold, incrementing the second number by the predetermined step, thereby obtaining a third number for the one or more groups, setting the second number as the first number, setting the third number as the second number, and repeating steps (a) to (f).

31. The computing device of claim 30, wherein determining the partition of the one or more groups comprises applying a dynamic programming technique to minimize a cost function representative of the total area.

32. A computing device comprising:

at least one processing unit; and a non-transitory memory communicatively coupled to the at least one processing unit and storing computer-readable program instructions executable by the at least one processing unit for:

obtaining duration information indicative of an amount of time taken by each of one or more tasks of a distributed compute phase of a distributed compute job to be executed in a distributed compute cluster, sorting the one or more tasks into one or more groups based on the duration information, and determining a resource requirement for each of the one or more groups, and determining, based on the resource requirement for each of the one or more groups, a time-varying allocation of resources of the distributed compute cluster for the distributed compute phase; and wherein determining the time-varying allocation of the resources for the distributed compute phase comprises, for each of the one or more groups:

determining an upper bound on a time until completion of a given one of the one or more tasks that is last to finish; and creating, based on the upper bound, a two-dimensional shape representative of an allocation of resources for the distributed compute phase, the two-dimensional shape having a width equal to a value of the upper bound.

33. The computing device of claim 32, wherein obtaining the duration information comprises obtaining input data from one or more historical runs of the distributed compute phase and extracting the duration information from the input data.

* * * * *